United States Patent
Hine et al.

(10) Patent No.: US 9,151,267 B2
(45) Date of Patent: Oct. 6, 2015

(54) WAVE-POWERED DEVICES CONFIGURED FOR NESTING

(75) Inventors: Roger G. Hine, Menlo Park, CA (US); Derek L. Hine, Portola Valley, CA (US)

(73) Assignee: Liquid Robotics, Inc., Sunnyvale, CA (US)

(*) Notice: Subject to any disclaimer, the term of this patent is extended or adjusted under 35 U.S.C. 154(b) by 566 days.

(21) Appl. No.: 13/424,170

(22) Filed: Mar. 19, 2012

(65) Prior Publication Data

US 2012/0285160 A1    Nov. 15, 2012

Related U.S. Application Data

(60) Provisional application No. 61/453,871, filed on Mar. 17, 2011, provisional application No. 61/502,279, filed on Jun. 28, 2011, provisional application No. 61/535,116, filed on Sep. 15, 2011, provisional application No. 61/585,229, filed on Jan. 10, 2012.

(51) Int. Cl.
*F03B 13/20* (2006.01)
*F03B 13/18* (2006.01)
*B63H 19/02* (2006.01)

(52) U.S. Cl.
CPC ............... *F03B 13/20* (2013.01); *B63H 19/02* (2013.01); *F03B 13/1885* (2013.01); *F05B 2240/931* (2013.01); *F05B 2260/02* (2013.01); *Y02E 10/38* (2013.01); *Y02T 70/59* (2013.01)

(58) Field of Classification Search
CPC ..... Y02E 10/38; B63B 21/66; F05B 2240/93; F05B 2240/932; F05B 2240/931; B63H 1/36; B63H 19/02; B63H 1/32; F03B 13/20; F03B 13/16; F03B 13/14; F03B 13/1865

USPC ............ 60/497, 501, 504; 114/243, 244, 248; 290/42, 53; 440/9, 13–16
See application file for complete search history.

(56) References Cited

U.S. PATENT DOCUMENTS 986,627 A    3/1911   Fischer
1,067,113 A    7/1913   Heyen
(Continued)

FOREIGN PATENT DOCUMENTS

BE    570555 A    9/1958
CN    1280936 A    1/2001
(Continued)

OTHER PUBLICATIONS

Wilcox, S. et al. "An Autonomous Mobile Platform for Underway Surface Carbon Measurements in Open-Ocean and Coastal Waters", Proceedings MTS/IEEE Oceans 2009, Biloxi, MS, Oct. 2009.*
(Continued)

*Primary Examiner* — Kenneth Bomberg
*Assistant Examiner* — Shafiq Mian
(74) *Attorney, Agent, or Firm* — Kilpatrick Townsend & Stockton LLP

(57) ABSTRACT

A wave-powered water vehicle includes a) a first component which is a float that travels on or near the water surface; b) a second component which is wave actuated and travels below the first component; and c) a means whereby the first component engages the second component and/or the second component engages the first component; wherein the engagement means provides lateral support of one component for the other, and thereby minimizes lateral movement of one against the other when the components are fitted together.

28 Claims, 15 Drawing Sheets

(56) References Cited

U.S. PATENT DOCUMENTS

| | | | |
|---|---|---|---|
| 1,315,267 A | 9/1919 | White | |
| 2,170,914 A | 8/1939 | Rummler | |
| 2,520,804 A | 8/1950 | Hollar | |
| 2,668,512 A | 2/1954 | Klas | |
| 2,868,504 A * | 1/1959 | Minty | 242/398 |
| 3,012,757 A * | 12/1961 | Marzolf | 254/280 |
| 3,132,322 A | 5/1964 | Maes | |
| 3,297,814 A | 1/1967 | McClean et al. | |
| 3,312,186 A | 4/1967 | Litshiem | |
| 3,341,871 A | 9/1967 | Oliveau | |
| 3,352,274 A | 11/1967 | Clakins | |
| 3,443,020 A | 5/1969 | Loshigian | |
| 3,453,981 A | 7/1969 | Gause | |
| 3,508,516 A | 4/1970 | Root | |
| 3,613,627 A | 10/1971 | Kennedy | |
| 3,708,991 A * | 1/1973 | Barkley | 405/194 |
| 3,760,441 A | 9/1973 | Handelman | |
| 3,828,380 A | 8/1974 | Lebovits et al. | |
| 3,845,733 A | 11/1974 | Jackman | |
| 3,859,949 A | 1/1975 | Toussaint et al. | |
| 3,860,900 A | 1/1975 | Scudder | |
| 3,872,819 A * | 3/1975 | Pickens | 440/9 |
| 3,889,045 A | 6/1975 | Logsdon | |
| 3,928,967 A | 12/1975 | Salter | |
| 3,962,982 A | 6/1976 | Marchay et al. | |
| 3,978,813 A | 9/1976 | Pickens et al. | |
| 4,134,023 A | 1/1979 | Salter | |
| 4,224,707 A | 9/1980 | Mariani | |
| 4,332,571 A | 6/1982 | Jakobsen | |
| 4,365,912 A * | 12/1982 | Burns | 405/60 |
| 4,371,347 A | 2/1983 | Jakobsen | |
| 4,383,725 A | 5/1983 | Bogese et al. | |
| 4,389,843 A | 6/1983 | Lamberti | |
| 4,462,211 A * | 7/1984 | Linderfelt | 60/501 |
| 4,484,838 A * | 11/1984 | Stevens | 405/191 |
| 4,598,547 A | 7/1986 | Danihel | |
| 4,610,212 A | 9/1986 | Petrovich | |
| 4,638,588 A | 1/1987 | Abadie | |
| 4,673,363 A | 6/1987 | Hudson et al. | |
| 4,684,350 A | 8/1987 | DeLima | |
| 4,684,359 A | 8/1987 | Herrington | |
| 4,726,314 A | 2/1988 | Ayers | |
| 4,763,126 A | 8/1988 | Jawetz | |
| 4,842,560 A | 6/1989 | Lee | |
| 4,896,620 A | 1/1990 | Jones | |
| 4,968,273 A | 11/1990 | Momot | |
| 4,981,453 A | 1/1991 | Krishan et al. | |
| 5,050,519 A | 9/1991 | Senften | |
| 5,084,630 A | 1/1992 | Azimi | |
| 5,147,148 A * | 9/1992 | White et al. | 405/199 |
| 5,273,443 A | 12/1993 | Frantz et al. | |
| 5,577,942 A | 11/1996 | Juselis | |
| 5,675,116 A | 10/1997 | Hillenbrand | |
| 5,678,504 A | 10/1997 | Toplosky et al. | |
| 5,690,014 A | 11/1997 | Larkin | |
| 5,902,163 A | 5/1999 | Baruzzi et al. | |
| 6,099,368 A | 8/2000 | Gorshkov | |
| 6,194,815 B1 | 2/2001 | Carroll | |
| 6,260,501 B1 | 7/2001 | Agnew | |
| 6,285,807 B1 | 9/2001 | Walt et al. | |
| 6,347,912 B1 * | 2/2002 | Thomas | 405/224.2 |
| 6,408,792 B1 | 6/2002 | Markels, Jr. | |
| 6,561,856 B1 | 5/2003 | Gorshkov | |
| 6,665,189 B1 | 12/2003 | Lebo | |
| 6,756,695 B2 * | 6/2004 | Hibbs et al. | 290/42 |
| 6,814,633 B1 | 11/2004 | Huang | |
| 6,908,229 B2 | 6/2005 | Landrieve et al. | |
| 6,980,228 B1 | 12/2005 | Harper | |
| 7,213,532 B1 * | 5/2007 | Simpson | 114/331 |
| 7,350,475 B2 | 4/2008 | Borgwarth et al. | |
| 7,371,136 B2 | 5/2008 | Hine et al. | |
| D578,463 S | 10/2008 | Tureaud et al. | |
| 7,472,866 B2 | 1/2009 | Heaston et al. | |
| 7,559,288 B2 * | 7/2009 | Amidon | 114/328 |
| 7,641,524 B2 | 1/2010 | Hine et al. | |
| 7,955,148 B2 | 6/2011 | Corradini | |
| 8,043,133 B2 | 10/2011 | Hine et al. | |
| 8,205,570 B1 | 6/2012 | Tureaud et al. | |
| 8,449,341 B2 * | 5/2013 | Denise et al. | 441/5 |
| 8,668,534 B2 | 3/2014 | Hine et al. | |
| 8,764,498 B2 | 7/2014 | Hine et al. | |
| 8,808,041 B2 | 8/2014 | Hine et al. | |
| 8,813,669 B2 * | 8/2014 | Race et al. | 114/244 |
| 8,825,241 B2 | 9/2014 | Hine et al. | |
| 8,912,677 B2 * | 12/2014 | Dehlsen et al. | 290/53 |
| 8,944,866 B2 | 2/2015 | Hine et al. | |
| 2002/0176747 A1 * | 11/2002 | Hanna et al. | 405/224 |
| 2002/0178990 A1 | 12/2002 | McBride et al. | |
| 2003/0009286 A1 | 1/2003 | Shibusawa et al. | |
| 2003/0174206 A1 | 9/2003 | Moroz | |
| 2003/0193197 A1 | 10/2003 | Hibbs et al. | |
| 2003/0220027 A1 | 11/2003 | Gorshkov | |
| 2004/0102107 A1 | 5/2004 | Gorshkov | |
| 2004/0190999 A1 * | 9/2004 | Wybro et al. | 405/203 |
| 2004/0217597 A1 | 11/2004 | Carroll et al. | |
| 2006/0213167 A1 | 9/2006 | Koselka | |
| 2007/0051292 A1 | 3/2007 | Kilbourn et al. | |
| 2007/0173141 A1 | 7/2007 | Hine et al. | |
| 2008/0188150 A1 | 8/2008 | Hine et al. | |
| 2008/0294309 A1 | 11/2008 | Kaprielian | |
| 2008/0299843 A1 | 12/2008 | Hine et al. | |
| 2009/0107388 A1 | 4/2009 | Crowell et al. | |
| 2009/0193715 A1 | 8/2009 | Wilcox | |
| 2009/0218984 A1 | 9/2009 | Parakulam | |
| 2009/0308299 A1 | 12/2009 | Luccioni et al. | |
| 2009/0311925 A1 | 12/2009 | Hine et al. | |
| 2010/0268390 A1 | 10/2010 | Anderson | |
| 2011/0059638 A1 | 3/2011 | Sandwith | |
| 2011/0174210 A1 | 7/2011 | Craig | |
| 2011/0192338 A1 | 8/2011 | Goudeau | |
| 2012/0029696 A1 | 2/2012 | Ota | |
| 2012/0029718 A1 | 2/2012 | Davis | |
| 2012/0069702 A1 | 3/2012 | Muyzert et al. | |
| 2012/0094556 A1 | 4/2012 | Hine et al. | |
| 2012/0295499 A1 | 11/2012 | Hine | |
| 2013/0068153 A1 | 3/2013 | Hine | |
| 2013/0102207 A1 | 4/2013 | Hine et al. | |
| 2014/0038477 A1 | 2/2014 | Hine et al. | |
| 2014/0263851 A1 | 9/2014 | Hine et al. | |
| 2014/0283726 A1 | 9/2014 | Ong et al. | |
| 2014/0284998 A1 | 9/2014 | Brennan et al. | |
| 2014/0290233 A1 | 10/2014 | Hine et al. | |
| 2014/0335747 A1 | 11/2014 | Hine et al. | |

FOREIGN PATENT DOCUMENTS

| | | | |
|---|---|---|---|
| CN | 268-9229 A | | 3/2005 |
| CN | 1715136 A | | 1/2006 |
| DE | 10141805 A1 | | 5/2002 |
| DE | 10300599 A1 | | 7/2004 |
| DE | 102007053037 A1 | | 5/2009 |
| DE | 202008013757 U1 | | 3/2010 |
| EP | 1369013 A1 | | 12/2003 |
| FR | 1159028 A | | 6/1958 |
| FR | 2669886 A1 | | 6/1992 |
| GB | 2461792 A | * | 1/2010 |
| JP | S 55-051697 | | 4/1970 |
| JP | S 64-050199 | | 3/1980 |
| JP | S 55-152698 | | 11/1980 |
| JP | S 61-057488 | | 3/1986 |
| JP | S 63-149289 | | 6/1988 |
| TW | 221588 | | 3/1994 |
| TW | 547434 | | 8/2003 |
| WO | 87/04401 A1 | | 7/1987 |
| WO | 94/10029 A1 | | 5/1994 |
| WO | 98/39205 A1 | | 9/1998 |
| WO | 98/46065 A1 | | 10/1998 |
| WO | 01/42992 A1 | | 6/2001 |

(56) References Cited

FOREIGN PATENT DOCUMENTS

| WO | 2007/087197 A2 | 8/2007 |
|---|---|---|
| WO | 2008/109002 A2 | 9/2008 |
| WO | 2013/077931 A2 | 5/2013 |

OTHER PUBLICATIONS

Olson, Robert A., "Communications Architecture of the Liquid Robotics Wave Glider", presented at Navigation Guidance and Control of Underwater Vehicles Conference, University of Porto, Porto, Portugal, Apr. 2012, 5 pages.
International Search Report and Written Opinion of International Application No. PCT/US2012/055797, mailed May 28, 2013, 11 pages.
Ageev. M., "Application of solar and wave energies for long-range autonomous underwater vehicles", Advanced Robotics, 2002, p. 43-55, vol. 16, No. 1.
Advanced Technology Office, "Persistent Ocean Surveillance Station-Keeping", DARPA; EXIF metadata shows image created Oct. 5, 2005, 1 page.
Anderson, B. and Padovani, B., "Towards a Comprehensive Regional Acoustic Study for Marine Mammal Distribution and Activity Regulation", A Liquid Robotics White Paper, Jan. 2012.
Clement et al., Wave energy in Europe: Current status and perspectives, Renewable and Sustainable Energy Reviews, 2002, p. 431, vol. 6, No. 5.
Communication from Japanese Patent Office on Oct. 18, 2011 on Japanese Application No. 2008-551327. [English translation].
Communication from Chinese Patent Office on Aug. 24, 2011 on Chinese Application No. CN200880006903.
Darpa, "Persistent Ocean Surveillance, Station Keeping Buoys, Program Overview", Aug. 31, 2004, 19 pages.
Department of the Navy., "ONR/MTS Buoy Workshop 2006, Persistent Unmanned Autonomous Buoy", 21 pages, believed to have been published Mar. 13, 2006.
Extended European Search Report and Opinion for EP Application No. 08726305, mailed on Jan. 15, 2013, 7 pages.
International Search Report for PCT/US2008/002743, mailed Sep. 8, 2008, 3 pages.
International Search Report and Written Opinion for PCT/US2012/029696, mailed Apr. 4, 2013, 21 pages.
International Search Report and Written Opinion for PCT/US2012/029718, mailed Dec. 21, 2012, 20 pages.
International Search Report and Written Opinion for PCT/US2012/029703, mailed Oct. 17, 2012, 14 pages.
International Search Report and Written Opinion for PCT/US2012/044729, mailed Oct. 17, 2012, 11 pages.
Joanne Masters, "Liquid Robotics Ocean Robots Embark on World Record Journey Across Pacific Ocean to Foster New Scientific Discoveries", Liquid Robotics, press release Nov. 17, 2011, 2 pages, San Francisco, CA.
Jones and Young., "Engineering a large sustainable world fishery," Environmental Conservation, 1997, p. 99-104, vol. 24.
Latt, Khine. "Persistent Ocean Surveillance—Station Keeping Buoys, Program Overview", DARPA, Aug. 31, 2004, 19 pages.
Lenton and Vaughan., "The radiative forcing potential of different climate geoengineering options", Atmos. Cem. Phys. Discuss., 2009, p. 2559-2608, vol. 9.
Martin, J.H and Fitzwater, S.E., "Iron Deficiency Limits Phytoplankton Growth in the north-east Pacific Subarctic", Nature, 1988, vol. 331, p. 341-343.
Martin., "Glacial-Integral CO2 Change: The Iron Hypothesis", Paleoceanography, 1990, p. 1-13, vol. 5, No. 1.
Olson, Robert A., "Communications Architecture of the Liquid Robotics Wave Glider".
Phelps, Austin. "Wave-Powered Motor Propels Model Boat", Popular Mechanics, Aug. 1949, pp. 182-183.
Rainville, Luc. "Wirewalker: an Autonomous Wave-Powered Vertical Profiler", Aug. 19, 2001, 7 pages.
Shaw, Albert. "The American Monthly Review of Reviews—An International Magazine", vol. 19, Jan.-Jun. 1899, 2 pages.
Solomon, S. et al., "Irreversible climate change due to carbon dioxide emissions", Proc. Natl. Acad. Sci. USA, 2009, vol. 106, No. 6, p. 1704-1709.
Sparks, David. "Persistent UnManned Autonomous Buoy (PUMA)", ONR/MTS Buoy Workshop 2006, SeaLandAire Technologies, Inc., Mar. 15, 2006, Texas A&M University, College Station, 26 pages.
Wilcox, S. et al. "An autonomous mobile platform for underway surface carbon measurements in open-ocean and coastal waters", In Proceedings MTS/IEEE Oceans 2009, Biloxi, MS, Oct. 2009.
Liquid Robotics (brochure), 2011, 48 pages, retrieved from [http://liquid.com/resources/press-kit.html] on Apr. 30, 2013.
Non-Final Office Action for U.S. Appl. No. 13/646,737, mailed Mar. 15, 2013, 7 pages.
Non-Final Office Action for U.S. Appl. No. 13/424,156, mailed Apr. 5, 2013, 10 pages.
Non-Final Office Action for U.S. Appl. No. 13/424,239, mailed Apr. 25, 2013, 19 pages.
International Preliminary Report on Patentability for PCT Application No. PCT/US2012/029703 mailed Sep. 26, 2013, 9 pages.
International Preliminary Report on Patentability for PCT Application No. PCT/US2012/029696 mailed Sep. 26, 2013, 13 pages.
International Preliminary Report on Patentability for PCT Application No. PCT/US2012/029718 mailed Sep. 26, 2013, 13 pages.
Final Office Action for U.S. Appl. No. 13/424,156, mailed Dec. 16, 2013, 9 pages.
Notice of Allowance for U.S. Appl. No. 13/424,239, mailed Feb. 10, 2014, 11 pages.
International Preliminary Report on Patentability for PCT Application No. PCT/US2012/055797 mailed Mar. 27, 2014, 6 pages.
Notice of Allowance for U.S. Appl. No. 13/424,156, mailed Mar. 31, 2014, 18 pages.
Office Action for Canadian Patent Application No. 2,679,565 mailed Apr. 7, 2014, 3 pages.
Non-Final Office Action for U.S. Appl. No. 13/621,803, mailed Apr. 24, 2014, 7 pages.
Notice of Allowance for U.S. Appl. No. 13/536,935, mailed May 30, 2014, 7 pages.
Non-Final Office Action for U.S. Appl. No. 13/753,377, mailed Jun. 24, 2014, 6 pages.
International Search Report and Written Opinion for PCT Application No. PCT/US2014/020853 mailed Jul. 1, 2014, 11 pages.
Office Action for Australian Patent Application No. 2012275286 mailed Aug. 22, 2014, 6 pages.
Notice of Allowance for U.S. Appl. No. 13/621,803, mailed Sep. 23, 2014, 5 pages.
Office Action for Australian Patent Application No. 2012327253 mailed Sep. 23, 2014, 5 pages.
Office Action for Australian Patent Application No. 2012228956 mailed Sep. 25, 2014, 3 pages.
International Search Report and Written Opinion for PCT Application No. PCT/US2014/030396 mailed Oct. 14, 2014, 17 pages.
Office Action for Australian Patent Application No. 2012228951 mailed Nov. 17, 2014, 4 pages.
Notice of Allowance for U.S. Appl. No. 13/753,377, mailed Nov. 24, 2014, 7 pages.
Office Action for Australian Patent Application No. 2012228948 mailed Nov. 27, 2014, 3 pages.
International Preliminary Report on Patentability for International PCT Application No. PCT/US2012/044729, mailed Jan. 16, 2014, 7 pages.
Office Action for Israeli Patent Application No. 215129 mailed Dec. 10, 2014, 3 pages.
Notice of Allowance for U.S. Appl. No. 13/753,377, mailed Feb. 4, 2015, 7 pages.
Office Action for European Patent Application No. 12740770.8, mailed Mar. 23, 2015, 8 pages.
Office Action for Chinese Patent Application No. 201280013911.7 mailed Jul. 31, 2015, 11 pages.
Non-Final Office Action for U.S. Appl. No. 14/303,470, mailed Aug. 4, 2015, 6 pages.

* cited by examiner

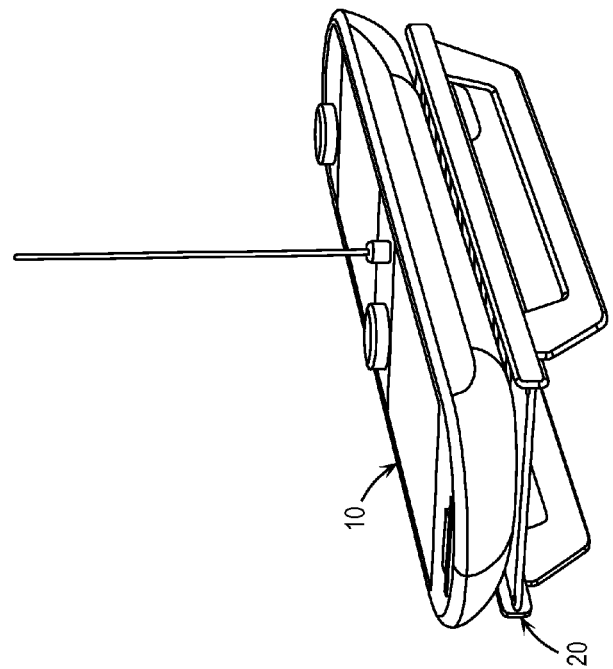
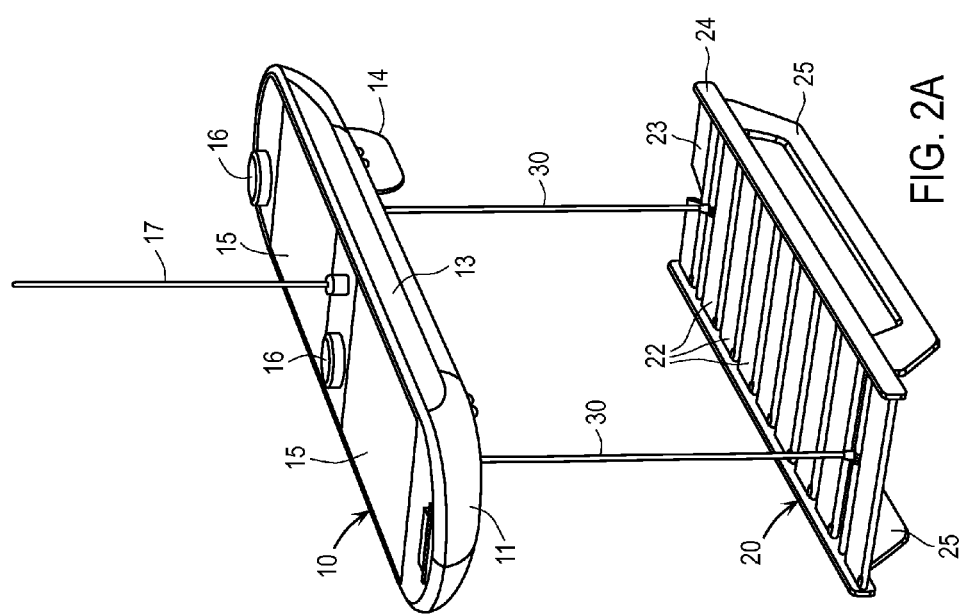
FIG. 2B
FIG. 2A

WAVE-POWERED DEVICES CONFIGURED FOR NESTING

CROSS REFERENCE TO RELATED APPLICATIONS

This application claims priority from and the benefit of the following provisional patent applications:
U.S. Application No. 61/453,871, filed Mar. 17, 2011, for "Wave-Powered Vehicles" (Roger G. Hine);
U.S. Application No. 61/502,279, filed Jun. 28, 2011, for "Energy-Harvesting Water Vehicle" (Roger G. Hine);
U.S. Application No. 61/535,116, filed Sep. 15, 2011, for "Wave-Powered Vehicles" (Roger G. Hine); and
U.S. Application No. 61/585,229, filed Jan. 10, 2012, for "Retractable Nesting Wing Racks for Wave Powered Vehicle" (Roger G. Hine and Derek L. Hine).

The following three applications (including this one) are being filed contemporaneously:
U.S. application Ser. No. 13/424,156, filed Mar. 19, 2012, now U.S. Pat. No. 8,764,498, issued Jul. 1, 2014, for "Wave-Powered Device with One or More Tethers Having One or More Rigid Sections" (Roger G. Hine); and
U.S. application Ser. No. 13/424,170, filed Mar. 19, 2012, for "Wave-Powered Devices Configured for Nesting" (Roger G. Hine and Derek L. Hine); and
U.S. application Ser. No. 13/424,239, filed Mar. 19, 2012, now U.S. Pat. No. 8,825,241, issued Sep. 2, 2014, for "Autonomous Wave Powered Substance Distribution Vessels for Fertilizing Plankton, Feeding Fish, and Sequestering Carbon From The Atmosphere" (Roger G. Hine).

This application is also related to the following U.S. and International patent applications:
U.S. application Ser. No. 11/436,447, filed May 18, 2006, now U.S. Pat. No. 7,371,136;
U.S. application Ser. No. 12/082,513, filed Apr. 11, 2008, now U.S. Pat. No. 7,641,524;
U.S. application Ser. No. 12/087,961, based on PCT/US 2007/001139, filed Jan. 18, 2007, now U.S. Pat. No. 8,043,133;
International Patent Application No. PCT/US 2007/01139, filed Jan. 18, 2007, published Aug. 2, 2007, as WO 2007/087197;
International Patent Application no. PCT/US 2008/002743, filed Feb. 29, 2008, published Sep. 12, 2008, as WO 2008/109002;
U.S. Application No. 61/453,862, filed Mar. 17, 2011, for "Distribution of Substances and/or Articles into Wave-Bearing Water" (Roger G. Hine); and
The U.S. and PCT applications filed on or about the same day as this application and claiming priority from U.S. Provisional Application Nos. 61/453,862 and 61/535,116.

The entire disclosure of each of the above-referenced patents, applications, and publications is incorporated herein by reference for all purposes.

BACKGROUND OF THE INVENTION

This invention relates to devices that are subject to waves in the water, and that in some cases utilize the power of waves in water.

As a wave travels along the surface of water, it produces vertical motion, but no net horizontal motion, of water. The amplitude of the vertical motion decreases with depth; at a depth of about half the wavelength, there is little vertical motion. The speed of currents induced by wind also decreases sharply with depth. A number of proposals have been made to utilize wave power to do useful work. Reference may be made, for example, to U.S. Pat. Nos. 986,627, 1,315,267, 2,520,804, 3,312,186, 3,453,981, 3,508,516, 3,845,733, 3,872,819, 3,928,967, 4,332,571, 4,371,347, 4,389,843, 4,598,547, 4,684,350, 4,842,560, 4,968,273, 5,084,630, 5,577,942, 6,099,368 and 6,561,856, U.S. Publication Nos. 2003/0220027 and 2004/0102107, and International Publication Nos. WO 1987/04401 and WO 1994/10029. The entire disclosure of each of those patents and publications is incorporated herein by reference for all purposes.

Many of the known wave-powered devices ("WPDs") comprise (1) a float, (2) a swimmer, and (3) a tether connecting the float and the swimmer; the float, swimmer, and tether being such that when the vehicle is in still water, (i) the float is on or near the surface of the water, (ii) the swimmer is submerged below the float, and (iii) the tether is under tension, the swimmer comprising a fin or other wave-actuated component which, when the device is in wave-bearing water, interacts with the water to generate forces that can be used for a useful purpose, for example to move the swimmer in a direction having a horizontal component (hereinafter referred to simply as "horizontally" or "in a horizontal direction"). The terms "wing" and "fin" are used interchangeably in the art and in this application.

It is desirable to position sensors and equipment in the ocean or lakes for long periods of time without using fuel or relying on anchor lines which can be very large and difficult to maintain. In recent years, the WPDs developed by Liquid Robotics, Inc. and marketed under the registered trademark Wave Glider®, have demonstrated outstanding value, particularly because of their ability to operate autonomously. It is noted that Wave Glider® WPDs are often referred to as Wave Gliders as a shorthand terminology. It is also noted that WPDs are often referred to as wave-powered vehicles ("WPVs").

SUMMARY OF THE INVENTION

A problem that arises with the known wave-powered devices is that they are difficult to transport, store, launch, and recover. Embodiments of the present invention provide a solution this problem by providing an assembly in which the tether and the wave-actuated component are nested closely to, and/or secured to, the float, thus making relatively compact assembly that can be maintained as a single unit until the time comes to launch the device on the water. A related solution, which is applicable when the tether, in use, is rigid, is described and claimed in detail in an application filed contemporaneously with this application and also claiming priority from U.S. Provisional Application Nos. 61/453,871 and 61/535,116. That related solution, which can be used in conjunction with the solution of this invention, it is to make use of a tether which, before the device is placed on water, can be maintained in a position adjacent to the float and which, before or after the device is placed on water, can be moved from the adjacent position to an extended position in which the tether is at least in part rigid.

The Summary of the Invention and the Detailed Description below, and the accompanying drawings, disclose many novel features, each of which is inventive in its own right, and any one or more of which can be used in combination where this is physically possible. The different aspects of the invention identified below are no more examples of the broad range of inventions disclosed herein.

In a first aspect of this invention, an assembly comprises: (1) a float; (2) a wave-actuated component; and (3) a closure component having a first state in which it secures the float and the wave-actuated component together as an assembly that can be moved as a unit and a second state that permits the wave-actuated component to move away from the float. The assembly is configured to accept a tether having a first end connected to the float and a second end connected to the wave-actuated component, such that when the closure component is in the second state and the assembly includes such a tether, the float, the tether, and the wave-actuated component form a wave-powered device (WPD).

When the float is placed on or near the surface of still water, the WPD has (a) the float floating on or near the surface of the still water, (b) the tether extending downwards from the float and under tension, and (c) the wave-actuated component being submerged below the float. When the float is placed on or near the surface of wave-bearing water, the WPD has (a) the float floating on or near the surface of the wave-bearing water, (b) the tether extending downwards from the float, and (c) the wave-actuated component being submerged below the float, and interacting with the water to generate forces that are transmitted to the tether.

The wave-actuated component is sometimes referred to herein as a "swimmer" or a "wing rack" (for those embodiments having multiple fins). It can comprise a fin system as disclosed in any of the documents incorporated herein by reference or any other mechanism that will interact with the water to generate forces that are transmitted to the tether.

In a second aspect of the invention, a float having top, bottom, and side surfaces comprises float side components that extend downwards from the side surfaces to create a space defined by the bottom surface and the float side components. Such a float is, for example, useful in the first aspect of the invention because the defined space can enclose the wave-actuated component.

In a third aspect of the invention, a wave-actuated component comprises components that extend upwards from the wave-actuated component and that will interact with a float to register the wave-actuated component in relation to the float.

In a fourth aspect of the invention, a wave-actuated component comprises components that extend downwards from the wave-actuated component, and when the wave-actuated component is placed upon a horizontal surface, the components that extend downwards separate the surface from any part of the wave-actuated component that might otherwise be damaged by contact with the surface.

In a fifth aspect of the invention, a wave-powered device comprises: (1) a float, (2) a flexible tether, and (3) a wave-actuated component, the tether connecting the float and the wave-actuated component. The float, the tether, and the wave-actuated component are such that, when (A) the device is in still water, (i) the float is on or near the surface of the water, (ii) the wave-actuated component is submerged below the float, and (iii) the tether is under tension, and (B) when the device is in wave-bearing water, the wave-actuated component interacts with the water to generate forces that are transmitted to the tether. In this aspect, the float comprises a winch that can be operated to change the length of the tether.

In a sixth aspect of the invention, a wave-powered device comprises: (1) a float, (2) a flexible tether, and (3) a wave-actuated component, the tether connecting the float and the wave-actuated component. The float, the tether, and the wave-actuated component are such that (A) when the device is in still water, (i) the float is on or near the surface of the water, (ii) the wave-actuated component is submerged below the float, and (iii) the tether is under tension, and (B) when the device is in wave-bearing water, the wave-actuated component interacts with the water to generate forces that are transmitted to the tether, wherein the tether has at least one of the following characteristics:

(1) the tether has a substantially flat configuration, for example with an average thickness of 1-3 mm;
(2) the tether is free from components that carry electrical currents and/or is free from components that carry signals of any kind;
(3) the tether comprises a plurality of round tensile members;
(4) the tether is a flat webbing constructed of a synthetic polymer, e.g., a polyamide, Spectran, Vectran, or Kevlar;
(5) the tether is a flat webbing that is tensioned only along the leading edge thereof, thus reducing fluttering and bowing;
(6) the tether is attached to the float at a hinge point that comprises a shaft and bushing arrangement such that the tether is not required to flex against its wide axis (pitch);
(7) at the float, the tether is guided through a 90° twist, and then flexes in the pitch axis over a pulley with its axis level and perpendicular to the longitudinal axis of the float;
(8) at the float, the tether is guided through a 90° twist, and then flexes in the pitch axis over a pulley with its axis level and perpendicular to the longitudinal axis of the float, wherein the pulley is crowned to increase the tension on the center of the tether to lessen the effect of the 90° twist increasing the tension of the outer parts of the tether, relative to the center of the tether.

In an seventh aspect of the invention, a fin system for use in a wave-powered device of any kind, including the wave-powered devices disclosed in the documents incorporated by reference herein, has at at least one fin that rotates about an axis and that has a neutral position, and a control system for controlling the rotation of the fin, and the control system comprises: a first means that controls the rotation of the fin within a first range about a neutral position; and a second means that controls the rotation of the fin when the movement of the fins is outside the first range. In embodiments, the angular movement of at least one fin is primarily controlled by a first spring or other means when the movement of the fins is within a first range about a neutral position and is primarily controlled by a second spring or other means when the movement of the fins is within a second range that is outside the first range, wherein the second spring is stiffer than the first spring, thus making it more difficult for the fins to move within the first range. The movement can be controlled solely by the first spring or by a combination of first spring and a second spring.

Within the second range, the movement can be controlled solely by the second spring or by a combination of the first spring and a second spring. The system can include a stop that prevents the first spring from moving beyond a first limit. The system can include a stop that prevents the second spring from moving beyond a second limit, and thus prevents the fin from moving outside a second range. Either or both of the springs can be replaced by an equivalent means that may be mechanical or electromechanical. When using such a system, when the waves in the wave bearing water are small, the rotation of the fins is controlled by the first spring and only a little fluid force is needed to rotate the fins to an angle within an effective range. As the waves become larger, the second spring comes into play and, by preventing the fins from "over-rotating" maintains the fins at an angle within an effective range. Excessive water forces can rotate the wing so that it dumps the load, thus protecting the system from overload.

In an eighth aspect of the invention, a method of obtaining information comprises receiving signals from, or recorded by, a WPD according to the first, fifth, or sixth aspect of the invention, or a WPD that comprises a float according to the second aspect of the invention, or a wave-actuated component according to the third or fourth aspect of the invention, or a WPD that comprises a fin system according to the seventh aspect of the invention.

In a ninth aspect of the invention, a method for controlling a function of a WPD comprising sending signals to a WPD according to the first, fifth, sixth, or seventh aspect of the invention, or a WPD that comprises a float according to the second aspect of the invention, or a wave-actuated component according to the third or fourth aspect of the invention, or a WPD that comprises a fin system according to the seventh aspect of the invention.

Nesting

The assembly of the first aspect of the invention makes use of a float and a wave-actuated component that are designed to fit closely to each other, e.g., in a nested or bundled configuration. For example, the float can comprise components that extend downwards and fit around the swimmer, and/or the swimmer can comprise components that extend upwards and fit around the float. One or both of the float and the wave-actuated component can include clips that help to secure the float and the swimmer together. Alternatively or additionally, one or more separate components, e.g., straps, can secure the float and the wave-actuated component together.

Fins forming part of the wave-actuated component can remain within, or extend beyond, the periphery of the float. This makes it easier for the float and the wave-actuated component to be handled as a single unit for storage and/or transport, before being launched as a WPD and can also facilitate recovery of the WPD. In some cases, the float and the swimmer can together form a package that can be handled as a single unit for shipping within recognized national and/or international weight and dimension restrictions. The combination of the float and the wave-actuated component can include the tether, so that, when the components are separated, there is a WPD ready for use. Alternatively, the tether can be absent from the package and be added to the assembly when the WPD is ready to be launched. The tether can comprise one or more rigid sections that can be folded, telescoped or otherwise collapsed, or a tether that can be wound up on a winch on the float.

In another aspect of the invention, a method of launching a WPD comprises (1) providing a WPD precursor that comprises a float and a wave-actuated component that are nested together, and a tether that is coiled and/or folded within the float and/or the wave-actuated component, and/or between the float and the wave-actuated component; (2) placing the WPD precursor on water; and (3) releasing the wave-actuated component from the float so that the wave-actuated component is submerged below the float and the tether is under tension between the float and the wave-actuated component.

In another aspect of the invention, a method of recovering a WPD that comprises a float, a wave-actuated component, and at least two tethers, that link the float and the wave-actuated component, the method comprising pulling one of the tethers upwards so that fins on the wave-actuated component have reduced resistance to upward motion.

In another aspect of the invention, a method of recovering a WPD that comprises a float, a wave-actuated component, and a tether that comprises at least one rigid section, the method comprising folding the tether upwards so that fins on the swimmer have reduced resistance to upward motion.

In another aspect of the invention, a WPD in which the tether is free from components that carry electrical currents and/or is free from components that carry signals of any kind. In this case, the wave-actuated component will generally also be free from electrical and electronic components. This reduces the danger that the performance of the WPD will be compromised by damage to the tether, particularly when making use of a tether that is flexible, since it is difficult to prevent failure of electrical wires in the tether, since the tether can be subject to large snap loads, and bending loads, resulting in damage to insulation surrounding electrical/electronic components, which in turn results in failure due to salt water incursion. Tethers without electrical wires can be thinner, and stiffer, and can have cross sections that make it easier to store the tether before the WPD is launched and/or to gather up the tether when the WPD is to be removed from the water.

A further understanding of the nature and advantages of the present invention may be realized by reference to the remaining portions of the specification and the drawings, which are intended to be exemplary and not limiting.

BRIEF DESCRIPTION OF THE DRAWINGS

FIG. 2A is a perspective view taken from above of a WPD having two rigid tethers and a wave-actuated component having two horizontal rigid spines (side beams) and a fin system between the rigid spines, with the tethers in their extended positions;

FIG. 2B is a perspective view taken from above of the WPD of FIG. 2A with the rigid tethers in their retracted positions so that the WPD is in a bundle configuration with the float sitting atop the wave-actuated component;

DESCRIPTION OF SPECIFIC EMBODIMENTS

Overview

Figure 1:
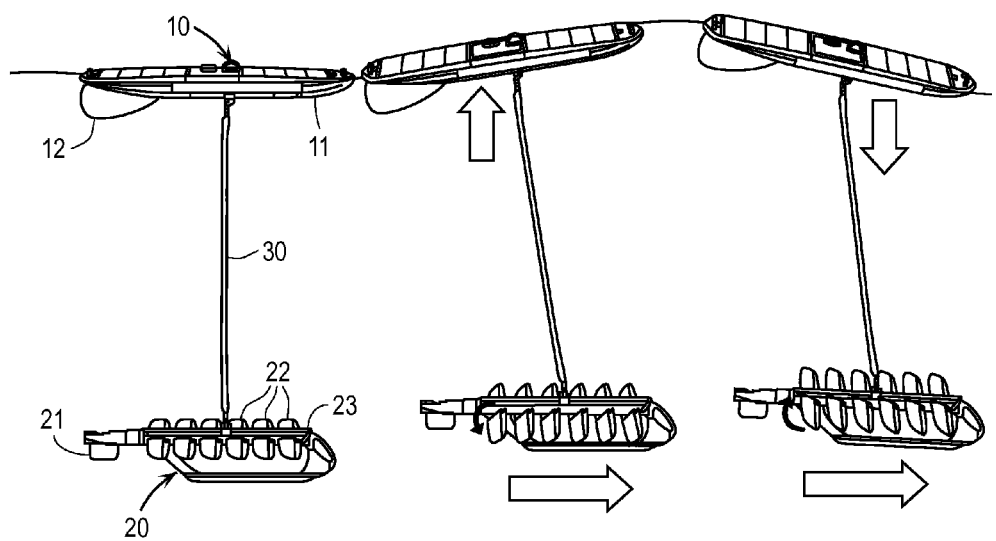
FIG. 1 is a pictorial view showing the operation of a wave-powered device ("WPD") in still water (fins/wings in neutral position), when a wave lifts the float (up-stroke), and when the WPD sinks into the wave trough (down-stroke)

FIG. 1 is a side view showing three images of a wave-powered water vehicle. The vehicle comprises a "float" 10 resting on the water surface, and a "swimmer" or "glider" 20 hanging below, suspended by a tether 30. The float 10 comprises a displacement hull 11 and a fixed keel fin 12. The swimmer comprises a rudder 21 for steering and "wings" or "fins" 22 connected to a central beam of the rack 23 so as to permit rotation of the wings around a transverse axis within a constrained range, and provide propulsion.

In still water (shown in the leftmost panel), the submerged swimmer 20 hangs level by way of the tether 30 directly below the float 10. As a wave lifts the float 10 (middle panel), an upwards force is generated on the tether 30, pulling swimmer 20 upwards through the water. This causers the wings 22 of the swimmer to rotate about a transverse axis were the wings are connected to the rack 23, and assume a downwards sloping position. As the water is forced downward through the swimmer, the downwards sloping wings generate forward thrust, and the swimmer pulls the float forward. After the wave crests (rightmost panel), the float descends into a trough. The swimmer also sinks, since it is heavier than water, keeping tension on the tether. The wings rotate about the transverse axis the other way, assuming an upwards sloping position. As the water is forced upwards through the swimmer, the upwards sloping wings generate forward thrust, and the swimmer again pulls the float forwards.

Thus, the swimmer generates forward thrust when either ascending or descending, resulting in forward motion of the entire craft.

Engaging and Securing Components of the Vehicle for Storage and Transport

Embodiments of the invention provide a technology for combining components of a multi-component wave-powered water vessel in a way that they can be stored or transported on land with minimal difficulty or damage.

One of the elements of this technology is an engagement means, wherein the components are configured to fit together in a manner that provides lateral support one component to another, and thereby minimizes lateral movement of one against the other when fitted together. In a two-way engagement means, the components are also configured to provide support one component to another in the longitudinal dimension, and thereby minimize longitudinal movement of one against the other when fitted together.

Lateral engagement means and optionally two-way engagement means between a float (the vessel body traveling on or near the surface of the water) and a swimmer (the rack of wings or fins that travels under water and provides loco-motive force) may be provided by configuring the float and swimmer so that they fit together one inside the other, or are configured so that projections from one component, the other component, or both receive and engage the other component.

In one such configuration, the swimmer has a smaller width and optionally a smaller length compared with the outermost edges of the float. The float is provided with a compartment or is hollowed out at the bottom to a depth whereby when the swimmer is secured to or contained within the hollow, the hollow conforms closely to the shape of the swimmer, thus providing lateral and potentially longitudinal stability. The roles of the components may be reversed, so that the float fits into a hollow in the swimmer. In another configuration, the swimmer has lateral beams or brackets on both sides that extend upwards to brace inwards against the sides of the float. The roles of the components may be reversed, so that the float has a lateral bracket on both sides that extends downwards to brace inwards against the sides of the swimmer. More complex configurations can also be designed where the float and swimmer are both provided with brackets, and the brackets interdigitate to provide lateral support and thereby minimize lateral movement of one against the other.

Another element of the technology is an integral securing means, whereby one component is secured against and either above or below another component in a manner that the components may be moved together on land without one component sliding against another. The securing means is integral in the sense that it is built into one component, the other component, or both, so that it is always present and not removed after deployment of the vessel into the water. In this way, it is made available to resecure the vehicle back on land after a course of duty on the water.

One such integral securing means is a connection between the components that may connect the components at a distance, but can be reduced in the length of the connection until the components are urged against one another. For example, when a float suspends a swimmer by way of a tether, the float may be provided with a locking or ratcheting winch to draw the swimmer upwards against the bottom of the float. Alternatively or in addition, components of the vessel may be equipped with integral securing means such as a clasp, clamp, or bolt that mates with and may be secured against a complementary element of another component after the components are brought together.

FIGS. 2A and 2B are perspective views from the upper left side of another wave-powered water vehicle having a different configuration. FIG. 2A shows the vehicle as it is deployed in the water. In this example, the float 10 is connected to the swimmer 20 by two tethers 30. The float 10 comprises a displacement hull 11 with a side panel 13 on each side. The rudder 14 is now placed on the float. Upward facing solar panels 15 generate electrical power to supply the electronics (not shown) that are contained in one or more sealed compartments 16. The electronics control navigation, and have an antenna 17 to transmit data and receive instructions wirelessly to other vessels and/or a control unit on shore. The swimmer 20 comprises a rack 23 now positioned to support the wings 22 on either side. The rack 23 comprises a side beam 24 on each side that is configured to engage the hull 11 of the float. The rack 23 also comprises downward facing support legs 25 to support the entire vehicle from below when on land.

FIG. 2B shows the vehicle when the swimmer 20 has been secured underneath the float 10 for transport or storage of the vehicle out of the water.

Figure 3A:
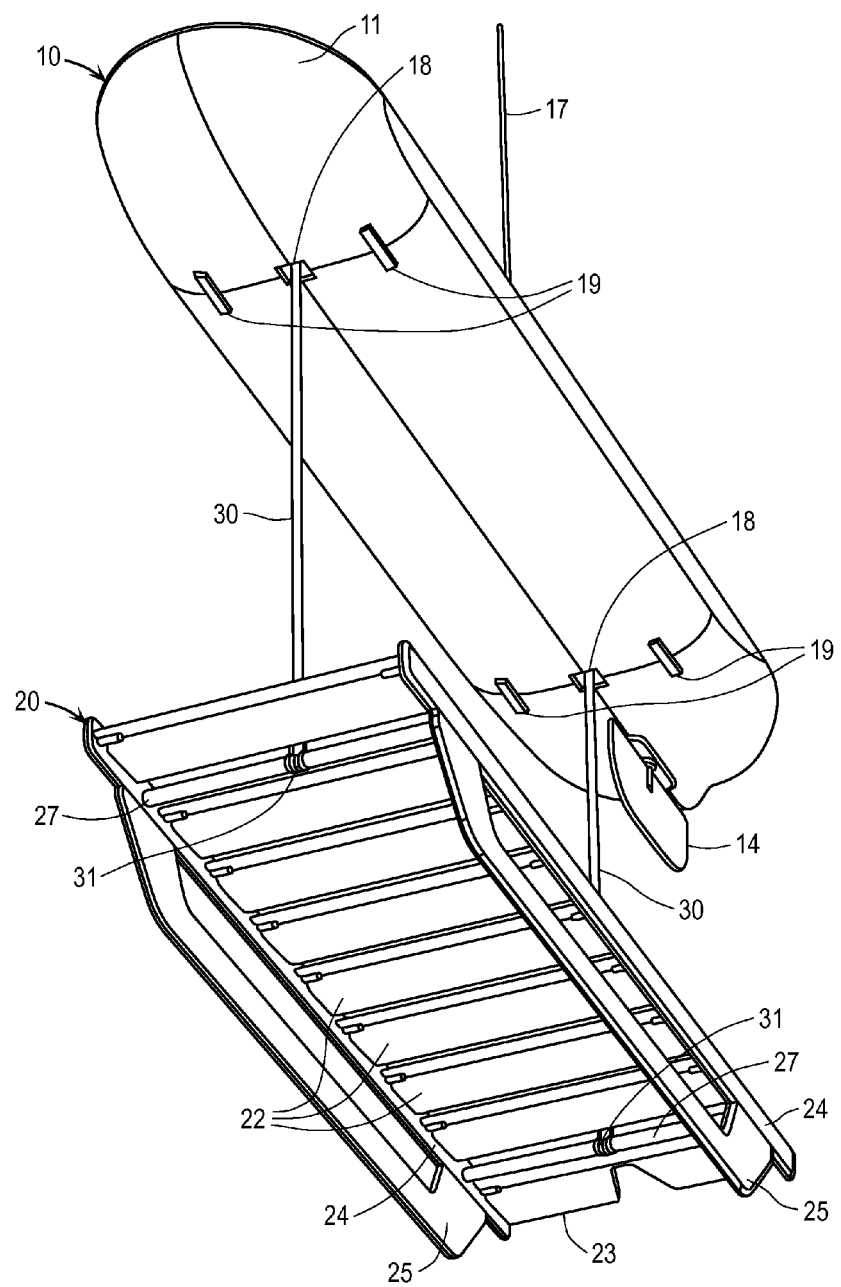
FIGS. 3A and 3B are perspective views taken from the bottom of the WPD of FIGS. 2A and 2B.
Figure 3B:
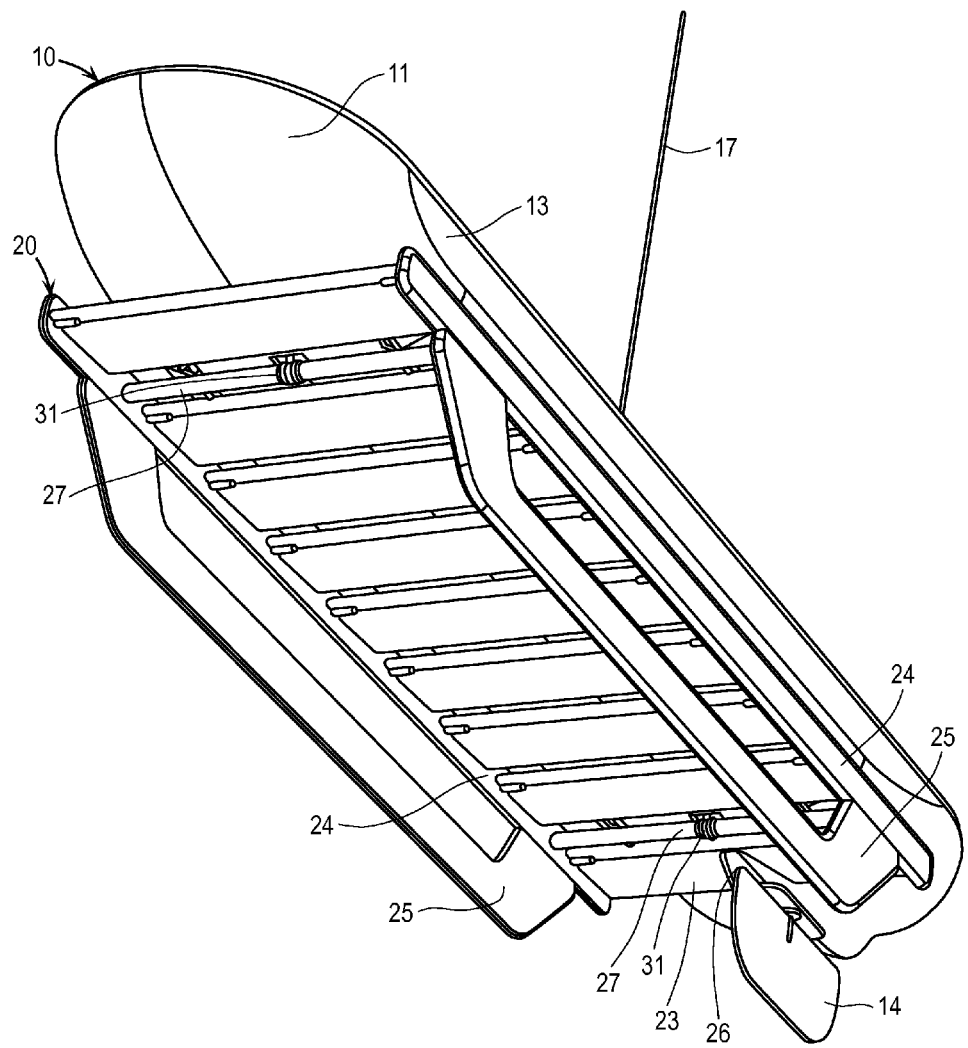

FIGS. 3A and 3B are perspective views from the lower left side of the same two-tether wave-powered vehicle. FIG. 3A shows the vehicle as it is deployed in the water. Each tether 30 is secured to the swimmer at a midpoint 31 on a transverse beam 27 between the two side beams 24 of the rack 23. Each tether passes through an opening 18 in the hull 11 of the float so that they may be winched up together to lift the swimmer 20. The hull 11 also has four couplers 19 to secure the swimmer 20 to the float for transport.

FIG. 3B shows the vehicle as it is secured for transportation or storage. The swimmer 20 is secured to the hull 11 of the float by retraction of the tethers that are joined at a midpoint 31 of two transverse beams 27, and closing the couplers 19 against transverse beams in the swimmer. The rudder 14 mounted on the float fits into a corresponding notch 26 on the rack 23 of the swimmer. The side beams 24 of the rack extend upwards to engage the sides 13 of the float.

In these figures, the side beams of the swimmer 20 constitute an engagement means by extending upwards so that they may engage opposite side panels of the float. There are also two types of securing means. One type is the two winches for bringing the two tethers up and into the float. When they are drawn in so that the swimmer is in the upmost position, the swimmer is secured against the bottom of the float. The other integral securing means is the four couplers 19 on the bottom of the float, which lock onto transverse beams of the swimmer.

Wave-Powered Vehicle Having Multiple Tiers of Fins that Nest Together

Figure 4:
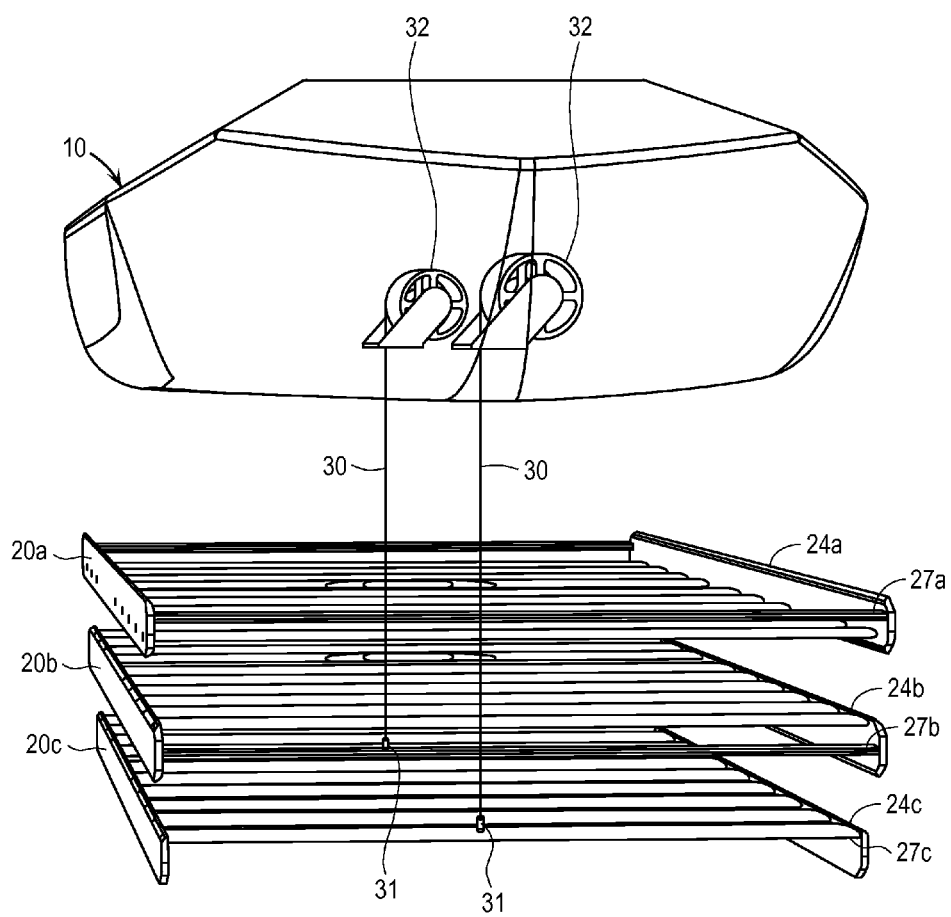
FIG. 4 is a perspective end view of a WPD showing three wing racks.

FIG. 4 shows a model of a wave-powered water vehicle that has multiple tiers of fins. Each of the three tiers (20a, 20b, and 20c) comprises a rack with a side beam on each side (24a, 24b, and 24c), and transverse beams (27a, 27b, and 27c) between the to sides. The upper tier 20a, the middle tier 20b, and the lower tier 20c are each secured to the tethers 30 at the midpoint 31 of the transverse beams 27. Each tether is mounted to a winch 32 in the float 10 to retract the three tiers against the float for storage or transport.

Figure 5A:
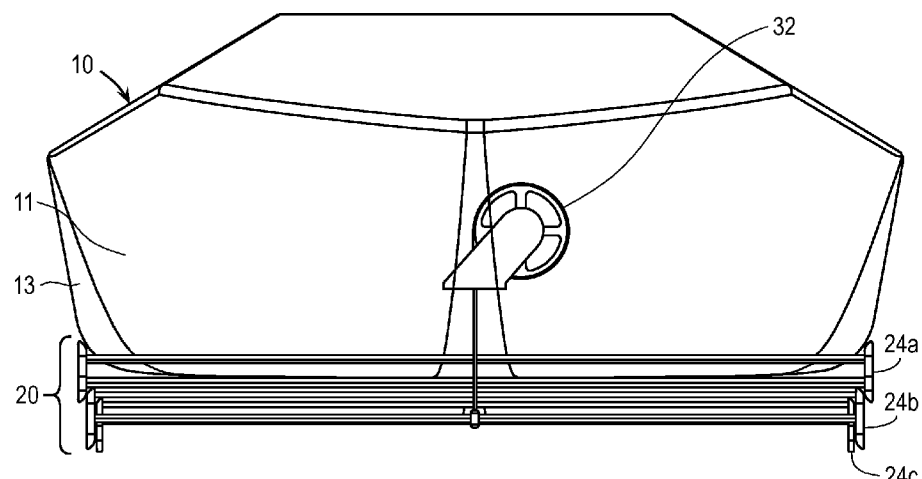
FIG. 5A is an end view of the WPD of FIG. 4 with the wing racks having been retracted and nested.

FIG. 5A shows a cut-away view of the three tiers 20 secured to the float 10. The winch 32 has been used to pull the tiers 20 against the bottom of the hull H. The tiers 20 nest together so as to reduce the height of the vehicle when the components are secured against each other for transport or storage.

Figure 5B:
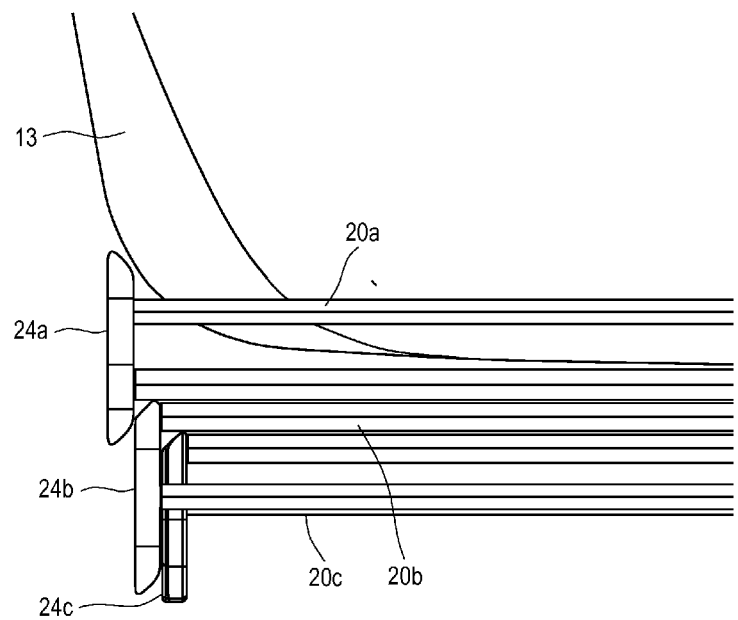
FIG. 5B is an enlarged view showing addition details of the nested wing racks shown in FIG. 5A.

FIG. 5B shows a detail of the tiers nested together. The uppermost tier 20a has a side beam 24a of each side that extends upwards to engage the corresponding side panel 13 of the float from below, and extends downwards to engage the corresponding side beam 20b of the middle tier 20b from above. The middle tier 20b is narrower in width so as to fit between the side beams 24a of the upper tier 20a. The middle tier has a side beam 24b on each side that extends upwards to engage the corresponding beam 24b of the upper tier from below on the inside, and extends downwards to engage the corresponding beam 24c of the lower tier 20c from above. The lower tier 20c is still narrower in width so as to fit between the side beams 24b of the middle tier 20b. The lower tier has a side beam 24c on each side that extends upwards to engage the corresponding beam 24b of the middle tier 20b from below on the inside, and extends downwards to provide a support leg for the entire vehicle to rest on when out of the water for transport or storage.

Thus, each tier is nested into the one above it by being narrower in width. The difference is about two times the thickness of the side beams, so that the side beam of each tier may engage the side beam of the tier above it. Since there is a close tolerance between the outermost side of the middle and lower tiers with the inside of the side beam of the tier above, the tiers are engaged one to another. Since there is a close tolerance between the inside of the top tier with the outer panel of the hull, the nested racks are engaged with the float. They may be secured in position by way of the tether winches, a lockable coupling mechanism, or both.

As an alternative nesting and engagement means, the nesting of the tiers may be done the other way up, so that the bottom tier is the widest, and the next tier is narrower to the extent required for the side beams to engage the side beams of the tier below it from the inside. As a third alternative, the tiers have substantially the same width, and nest by having side beams that splay downwards to fit over the tier below.

Figure 6:
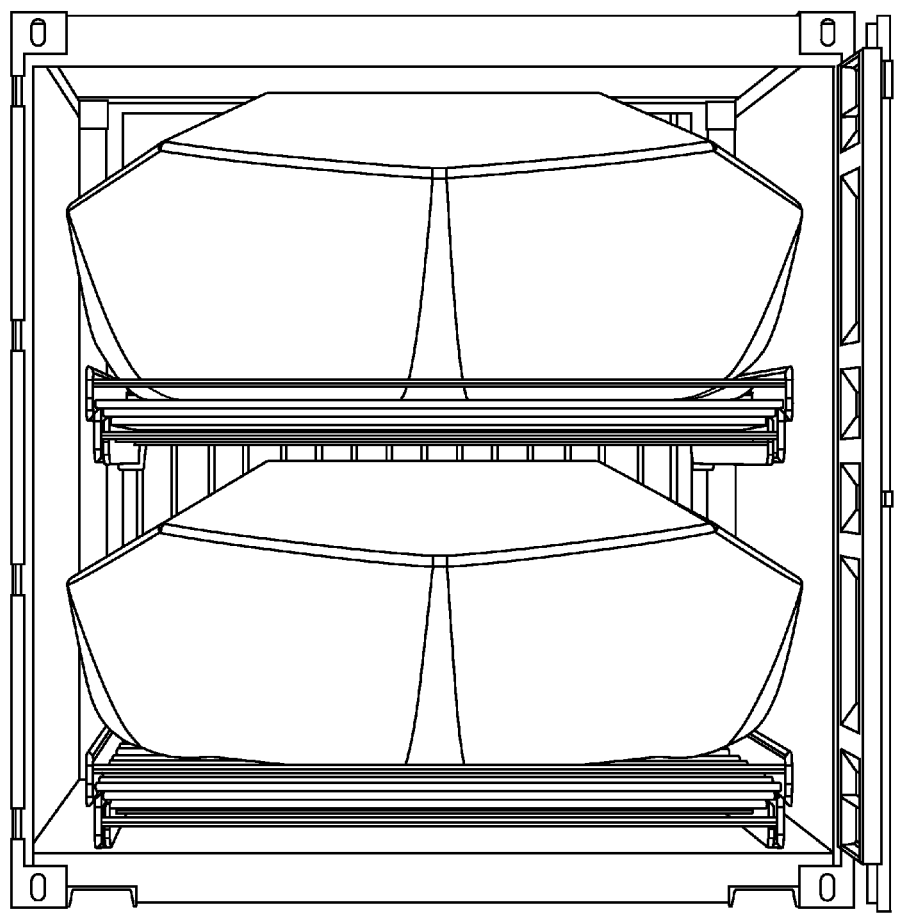
FIG. 6 is an end view showing two WPDs of the type shown in FIG. 5A, both in their retracted configurations stowed in a container.

FIG. 6 shows two wave-powered water vehicles, each with three tiers of wings. The nesting allows the tiers to be packed closer together, reducing the height of the vehicle secured out of the water so that the two may be transported or stored one on top of the other in a standard sized metal shipping container.

Wave-Powered Vehicle Having an Opening for Dispensing a Payload or Equipment

In some instances, a wave-powered water vehicle of this invention may be wanted to dispense a large payload, or to lower equipment. For such purposes, the vehicle may be provided with a large opening (typically at or near the center of floatation) through which such payload or equipment may be dropped or lowered.

Figure 7A:
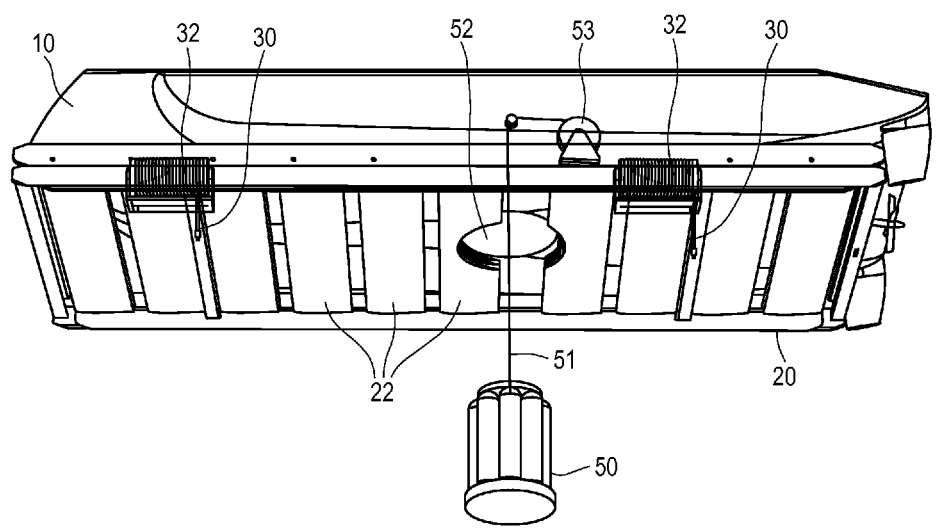
FIG. 7A is a perspective view from the bottom showing a WPD of the type shown in FIG. 5A with the wing racks retracted and a sensor payload array lowered through a central opening in the wing racks.

FIG. 7A shows such a vehicle in a perspective view from the lower right side. There is a plurality of racks 20 comprising propulsion wings 22. The racks are shown drawn against the bottom of the float 10 by retracting the tethers 30 up into the float each using a winch 32. All of the tiers of wing racks 20 and the bottom of the hull of the float 10 have been provided with openings 52 that substantially align downwards. This enables the user to deploy equipment 50 (such as monitoring or sensor equipment) or a payload through the hole either by dropping, or by lowering on a line 51 that extends from a winch 53 or lowering motor that is aboard the float.

Figure 7B:
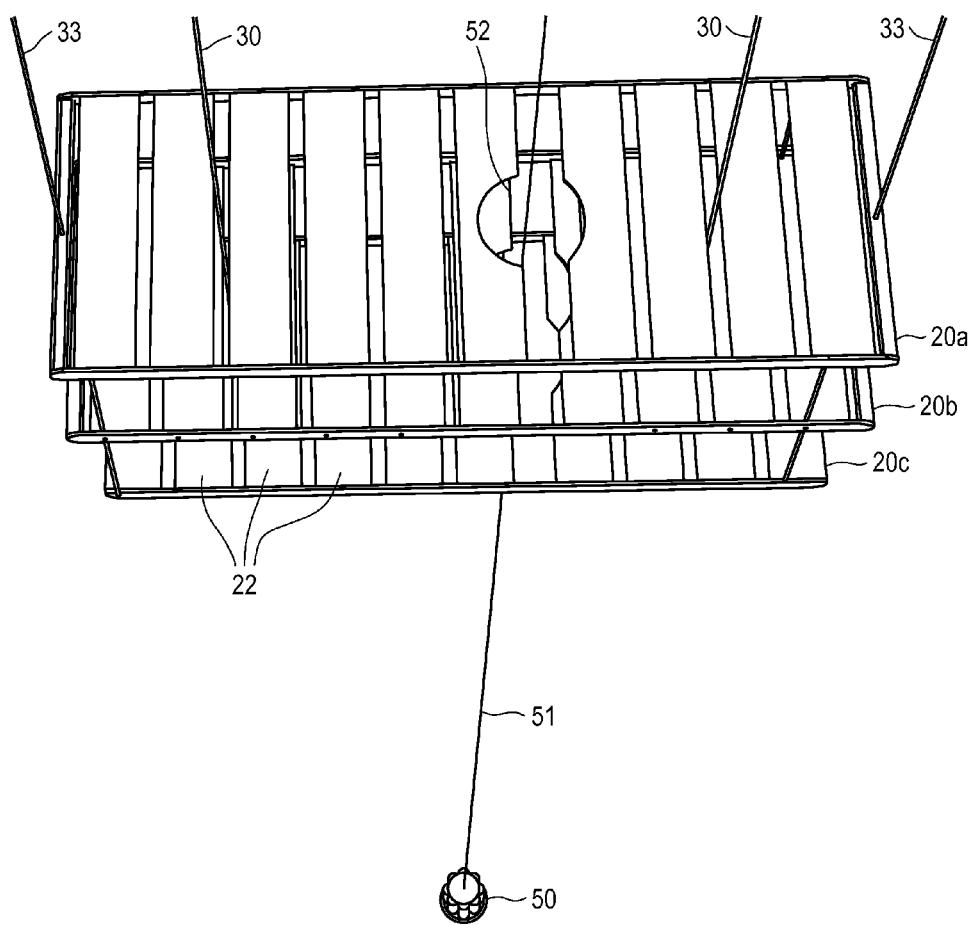
FIG. 7B is a perspective view from the top showing the wing racks lowered and the sensor payload array deployed below them.

FIG. 7B shows a detail of the vehicle in a perspective view from the upper right side. Here, three tiers of wing racks 20a, 20b, and 20c have been lowered to the downwards (propulsion providing) configuration using the tethers 30. Each of the three racks comprise an opening 52 made by omitting or cutting out a portion of the wings corresponding to the hole on each tier. Here, the wing racks are further stabilized and aligned above each other using guide wires 33 at the front and back of the racks. This helps align the opening in each rack 20 in rough seas so that the payload 50 may be passed on the line 51 directly through the holes 52 without substantially disturbing any of the racks.

Catamaran Style Wave-Powered Vehicles

Figure 8A:
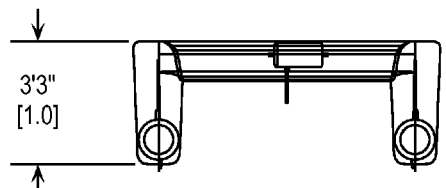
FIGS. 8A, 8B, 8C, and 8D are end, top, side, and bottom views of a configuration suitable for compact stowing and transport where the wing rack or racks can nest in a recess in the bottom of the float.
Figure 8B:
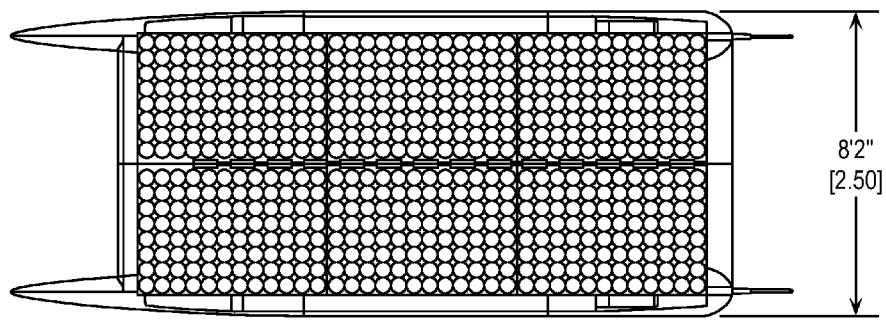
Figure 8C:
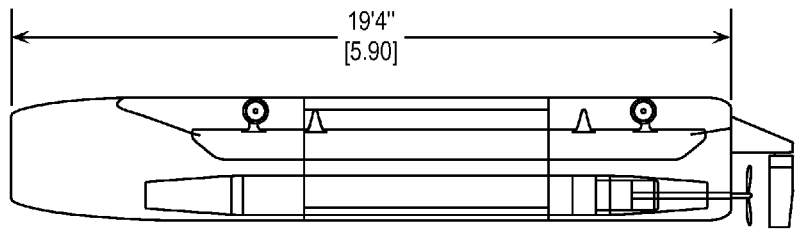
Figure 8D:
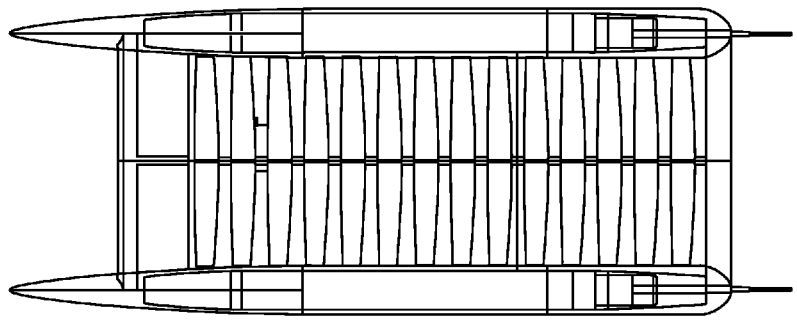

FIGS. 8A, 8B, 8C, and 8D depict a wave-powered vehicle having a float comprising two floating elements or pontoons that track over the water in parallel one beside each other. FIG. 8A is a transverse cut-away view; FIG. 8B is a perspective from above showing solar panels on the top surface; FIG. 8C is a cut-away view down the middle; FIG. 8D is a perspective from below the rack of propulsion wings. The two pontoons are connected over the top, which provides a platform for mounting solar panels and electronic equipment. The cavity formed between the two pontoons provides a cavity that engages the swimmer from each side. Here, the swimmer is shown with a single wing rack, although multiple nesting wing racks can also be used. There are matching rudders at the end of each pontoon. In this example, there is also a propeller drawing power from a battery to provide locomotive power to the vessel when wave action is insufficient to drive the vehicle at the desired speed.

Figure 9:
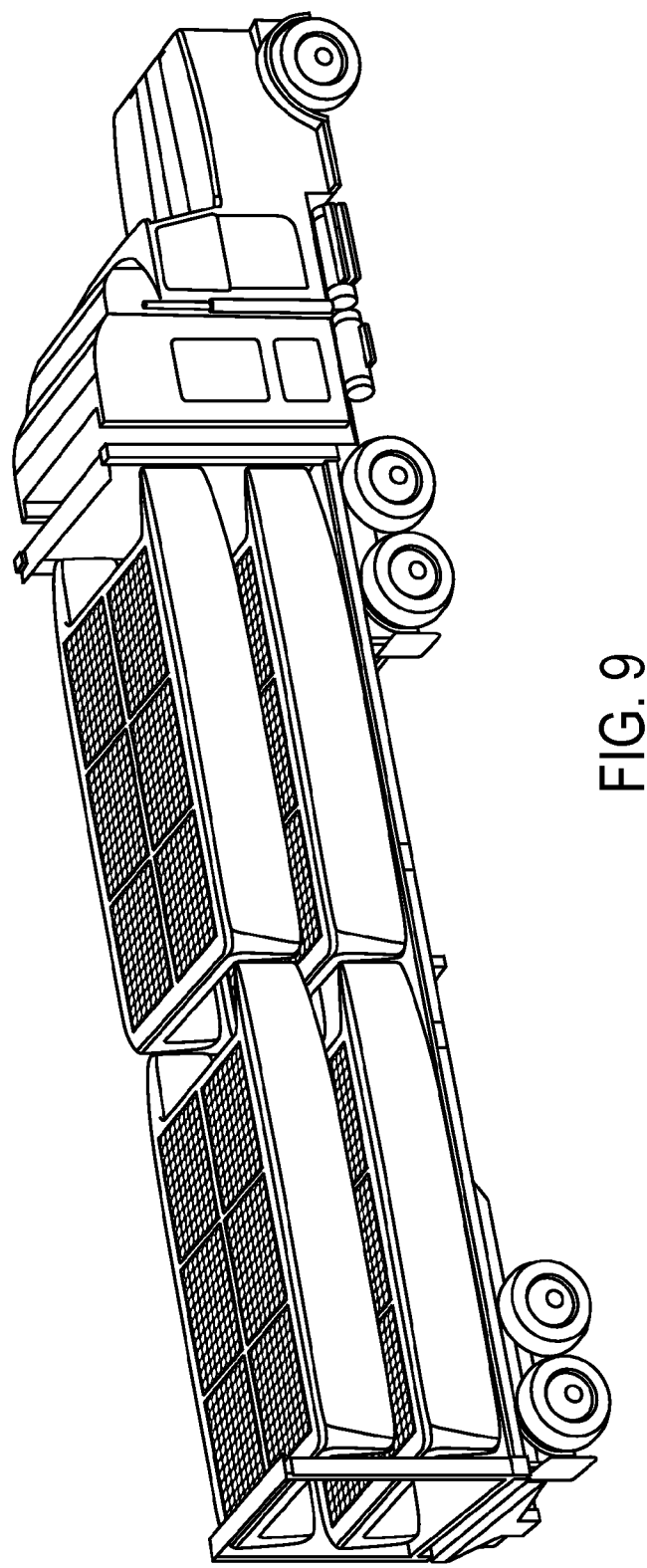
FIG. 9 shows four such nested WPDs being transported on a flatbed trailer.

FIG. 9 shows four catamaran-style wave-powered vehicles mounted on a truck. The vehicles are stored inside a shipping container mounted on a truck. In this drawing, the sides and top of the shipping container have been cut away to show the storage configuration. Sizing the swimmer or wing racks to be retractable between the two pontoons of each catamaran compacts the storage size. This allows four of the wave-powered vehicles to be stored and transported in a single standard-sized shipping container.

Spring Arrangement for Controlling Wing Rotation with Gradations of Torque

Figure 10A:
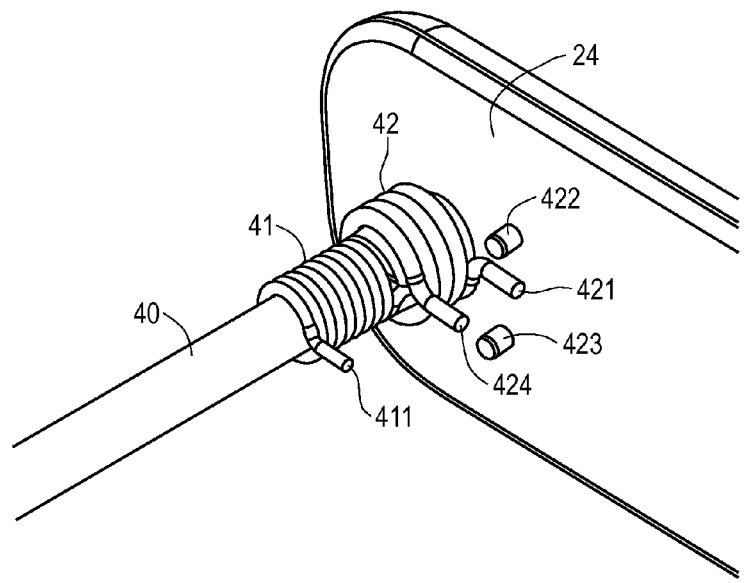
FIG. 10A is a perspective view showing a two-spring arrangement for controlling the movement of a fin (not shown), which is part of a wave-actuated component such as any of the WPDs described herein, viewed looking from between the spines (side beams)
Figure 10B:
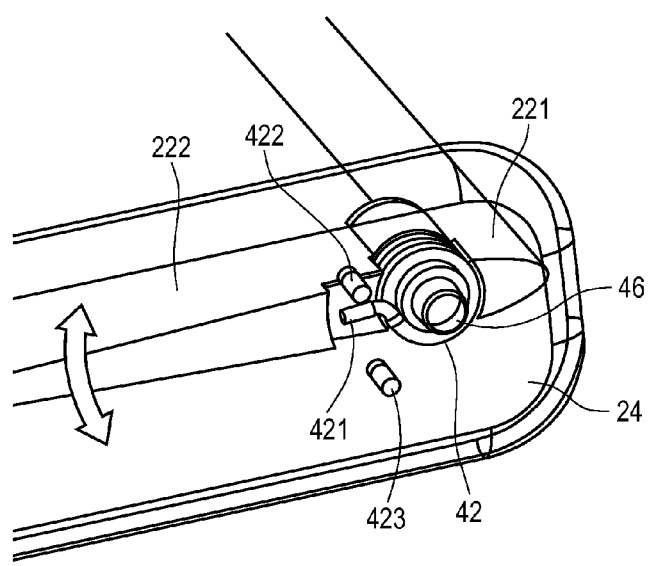
FIG. 10B is a partially cutaway perspective view showing the two-spring arrangement with one end of each spring embedded in the fin, viewed looking from outside the spines (side beams)

FIGS. 10A and 10B show a two-spring arrangement for controlling the movement of a fin, which is part of a wave-actuated component such as is shown in FIG. 2A. The spring arrangement constrains upward and downward rotation of the fins within two ranges requiring increasing torque. FIG. 10A is an upper perspective of the spring arrangement on the foremost fin or wing (not shown) to the right side beam 24 from behind on the inside, with the fin removed. FIG. 10B is an upper perspective of the same spring arrangement from behind on the outside, with the beam drawn transparently and showing a portion of the fin.

The fin is rotationally mounted to the side beam 24 by way of an axle 40 that passes transversely through the fin 22 just behind the leading edge 221 with the elevator portion of the fin 222 extending behind. The spring arrangement comprises a first and second springs 41 and 42. The first spring is wound around the axle 40 (shown in this example on the inside of the side beam 24. The first spring 41 extends from the axle at one end 411 to form a hook portion disposed to provide a point of attachment for the fin. In this embodiment, the other end of the first spring, not shown, is fixed to the side beam.

The second spring is also wound around the axle 40 in the same direction as the first spring 41. In this example, the second spring is thicker, and therefore stiffer, than the first spring. The second spring 42 extends from the axle at one end 424 to form a hook portion disposed to provide a point of attachment for the fin. The second spring 42 extends from the axle at the other end 424 to form a hook portion disposed to travel between an upper stop 422 and a lower stop 423 mounted on the side beam 24.

With this configuration, the first spring 41 is engaged to control the upward and downward rotational movement of the wing but the second spring is not—as long as the movement is within the range defined by the stops for the second spring. When the rotation of the wing goes beyond what is permitted by the stops, then the second spring 42 becomes engaged. As a consequence, the torque required to rotate the wing is now determined by both springs, and more torque is required to rotate the wing further in the same direction.

Figure 11:
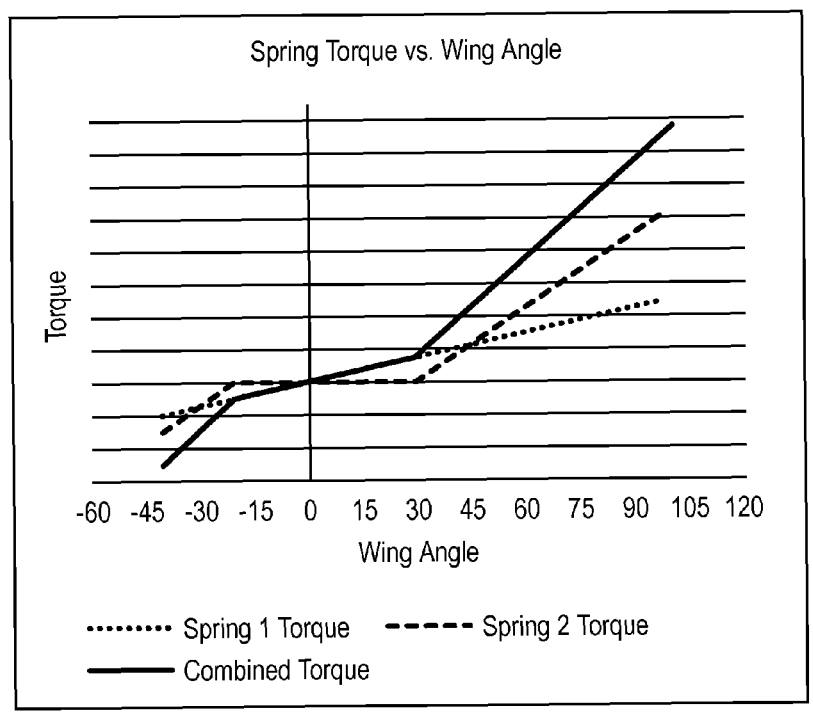
FIG. 11 is a graph of spring torque as a function of fin (wing) angle.

FIG. 11 is a graph showing the torque required to alter the angle of a wing of the vehicle in either direction from a neutral position. The torque required to operate the wing within the inner range is determined by the first spring alone, beyond which the torque required to alter the angle in either direction is determined by the combined torque of both springs.

Winch Design and Use

In another aspect of the invention, a WPD includes one or more winches (or their equivalent) that can store and release a tether before the WPD is launched, and/or can control the length of the tether when the WPD is in use, and/or can gather up the tether when the WPD is taken out of use, e.g., removed from the water completely. Preferably, when using a winch, the tether is free from electrical connections. If the tether does contain electrical connections, the winch system is more complicated. For example, the electrical connections will need to exit the center of the winch spool with slip rings or similar devices. Tethers without electrical connections may be thinner, enabling more wraps and greater length on the same diameter spool of a winch. Through the use of one or more winches, it is possible to obtain one or more of the following advantages:

(1) to optimize the distance between the float and the wave-actuated component, depending on the actual expected wave and wind conditions (for example, longer to capture energy from slow, deep waves; shorter to reduce tether drag in high frequency wind chop).

(2) to reduce the distance between the float and wait-actuated component in order to get over under-sea obstacles or to release the swimmer if it is stranded in shallow water.

(3) to clean the tether, at regular or irregular intervals, by pulling the tether upwards through wipers, thus removing or reducing fouling which produces undesirable drag on the tether.

(4) to simplify deployment and recovery, particularly when the float and the wave-actuated component are designed so that they can be close to each other, e.g., in a nested configuration, for example when the float and the wave-actuated component can form a single tight bundle which is suitable for shipping and/or storage and which can be easily deployed into an operating condition in response to physical and/or electrical and/or electronic commands.

(5) when there are two tethers, to remove twist by using the winch or winches to pull both tethers upward.

Figure 12A:
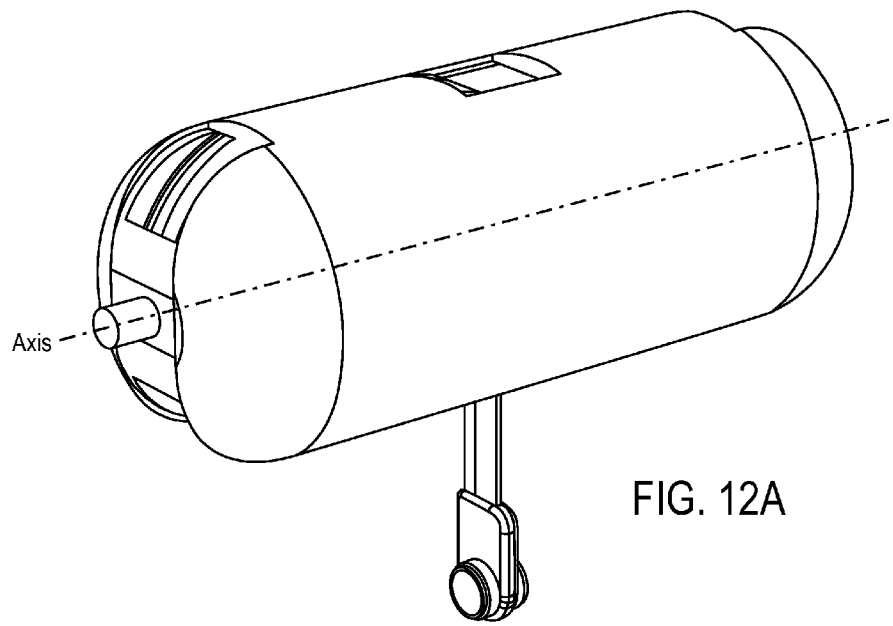
FIGS. 12A and 12B are external and cutaway perspective views of a winch that can be used with embodiments of the present invention.
Figure 12B:
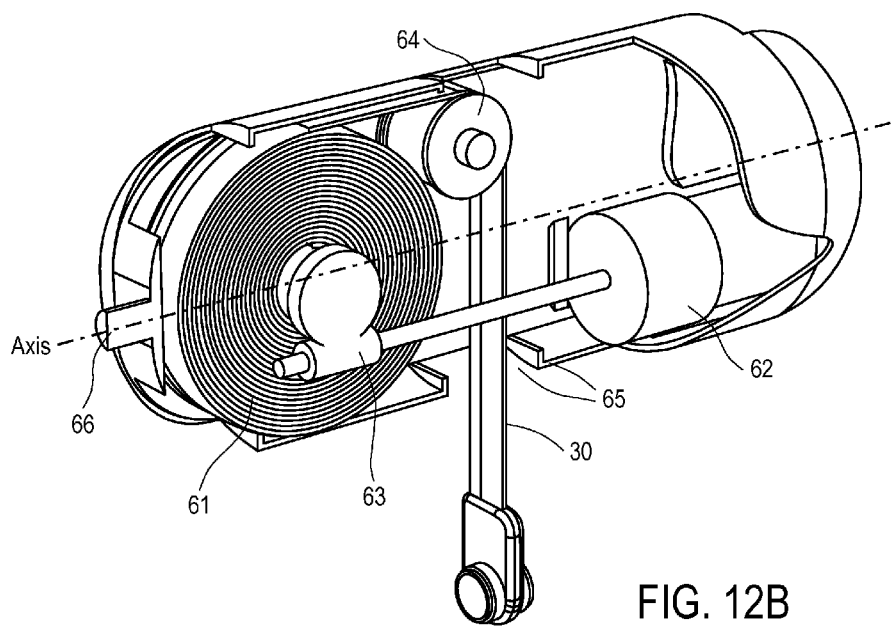

FIGS. 12A and 12B are drawings of a winch that may be used to raise and lower the tethers that attach the float to the swimmer or wing racks in a wave-powered vehicle of this invention. Typically, each tether has its own winch, which are coordinated to raise the swimmer simultaneously. FIG. 12A shows the winch with the cover closed. FIG. 12B is a perspective of the winch with the covering cut away to show what's inside. The tether 30 is rolled onto a spool 61 driven by a worm drive 63 attached to an electric motor 62. The tether winds and unwinds from the spool over a pulley 64 downwards through an opening 65 in the covering.

The tether 30 is flat and streamlined, so it will not flex easily in the pitch axis. A 160 mm OD spool may support $10m$ of tether if the tether is 2 mm thick. To allow the tether to pivot in pitch, the entire winch assembly is mounted on bearings at either end so that it pivots along a center axis 66. It has a cylindrical cover that is foam filled to displace water. The float will have a corresponding cylindrical opening so that minimum empty space is allowed to fill with water.

Wipers (not shown) are positioned in the winch assembly to clean slime and scum off of the tether before it is wound on the spool. This removes bio-fouling and may periodically be done to improve vehicle speed performance. The tether may include magnetic markers and magnetic sensors, such as hall effect sensors, may be positioned to measure movement of the tether. Alternatively, the tether may have variable magnetic permeability and a magnet may be one side of the tether as it enters the winch area while a hall sensor is on the other side. Since scum may change the effective thickness of the tether, this system can help maintain the correct deployed length.

Multiple e.g., Dual Tethers

In another aspect of the invention, a WPD comprises a first tether that is attached (i) to the float at a first float location, and (ii) to the wave-actuated component (or swimmer) at a first swimmer location, and (2) a second tether that is attached (i) to the float at a second float location that is different from the first float location, and (ii) to the swimmer at a second swimmer location that is different from the first swimmer location, and the WPD has at least one of the following features (i.e., having one of the following features or a combination of any two or more of the following features):

(1) At least one of the tethers is secured to a winch secured to the float. In one embodiment, both tethers are secured to the same winch. In another embodiment, one of the tethers is secured to a first winch and the other secured to a second winch. Optionally, the winch is mounted so that it can pivot along a center axis.

(2) The horizontal distance between the front of the float and the first float location is at most 0.3 times, preferably at most 0.2 times, e.g., 0.05-0.15 times, the horizontal length of the float.

(3) The horizontal distance between the rear of the float and the second float location is at most 0.3 times, preferably at most 0.2 times, e.g., 0.05-0.15 times, the horizontal length of the float.

(4) The horizontal distance between the front of the swimmer and the first swimmer location is at most 0.3 times, preferably at most 0.2 times, e.g., 0.05-0.15 times, the horizontal length of the swimmer.

(5) The horizontal distance between the rear of the swimmer and the second swimmer location is at most 0.3 times, preferably at most 0.2 times, e.g., 0.05-0.15 times, the horizontal length of the swimmer.

(6) At least one of the tethers has a substantially flat configuration, for example with an average thickness of 1-3 mm, thus facilitating the handling of the tether, particularly when the tether is to be wound up on a winch.

The use of dual tethers can reduce the likelihood that the tethers will become twisted; can enable a longer and narrower float shape (which reduces drag and increases speed); and by moving the connections and mechanisms associated with the tether to the fore and aft sections of the float, makes it possible to provide a larger central area of the float for payloads of all kinds, for example communications equipment and sensors and other scientific instruments. In addition, the use of two tethers can simplify recovery of a WPD. Recovering a WPD that has only a single tether can be difficult because pulling up on the single tether requires lifting the swimmer against the resistance of the fins to the water. When there are two tethers, pulling on only one of the tethers tilts the swimmer and the fins attached to it so that the resistance of the fins is reduced. This is true, whether or not the WPD makes use of a winch to shorten the tether.

A WPD having a single tether generally has a tether termination assembly and load distribution structure at the center of the float, thus occupying the center of the float. The use of two spaced-part tethers frees up the center of float, which for many purposes is the most valuable part of the float desirable components. For example, the best part of the float for tall antennas is the center, where they can cast a shadow on at most half of solar panels mounted on the upper surface of the float (shading just part of a solar panel can completely disable it if, as is often the case, the cells are wired in series and shut off like transistors when dark.) Also, tall antennas have no steering effect on the float due to wind if they are at the center. When the WPD has two tethers, the center area of the float may be free for payloads with integrated antennas, i.e., antennas that are integrated with a dry box, or kept entirely within a dry area, thus reducing the danger that routing wires to the antennas will be damaged by moisture. In addition, placing most or all of the payload at the center of float makes it easier to balance the float fore and aft, and thus reduces the danger that the float will nose in or nose up.

When the WPD has two tethers, the float preferably contains a means to steer the float, such as a rudder at the tail end of the float. The wave-actuated component (swimmer) provides thrust as it is lifted and lowered due to wave action. Torque from the float is transmitted to the wave-actuated component by the separation of the two tethers. The wave-actuated component thus points in the same direction as the float after a steering lag, caused by the inertia and fluid resistance to rotation of the wave-actuated component.

In one configuration, there is a fore tether and an aft tether, preferably on a relatively long narrow float. While the tethers are taut, the wave-actuated component is held parallel with the float. Particularly when the wave-actuated component is held relatively level, a spring and stop system can control the angle of fins well, so that the fins operate at a favorable angle of attack during up and down motions with various speeds and amplitudes. The wave-actuated component can for example have a parallel bar structure with fin support shafts crossing between bars like ladder steps. The position of the fins can for example be controlled by a spring assembly that maintains the fins as a desired neutral position, e.g., a level position, when the springs are not moving and that will resist upward and downward motion. The spring profile may be adjusted so that the wings tend to stop at an angle that is optimized for maximum lift.

In another configuration, there are right and left tethers. These may connect to a single monolithic wing. The wing can move as a unit, pivoting at a point at which both the tethers are attached to the wing. A weight below the wing causes it to nose down and dive forward when lowered. The attachment point to the tethers is forward of the center of wing area so that the wing will nose up and pull forward when raised by the tethers. As in the fore-aft configuration the rudder that steers the float, also indirectly steers the glider by the separation of the two tethers.

In other configurations, 3 or 4 tethers may be used to stabilize the glider. This is useful especially in large systems. On the other hand, the presence of too many tethers is undesirable because each tether represents additional drag.

Communications and Control

Figure 13:
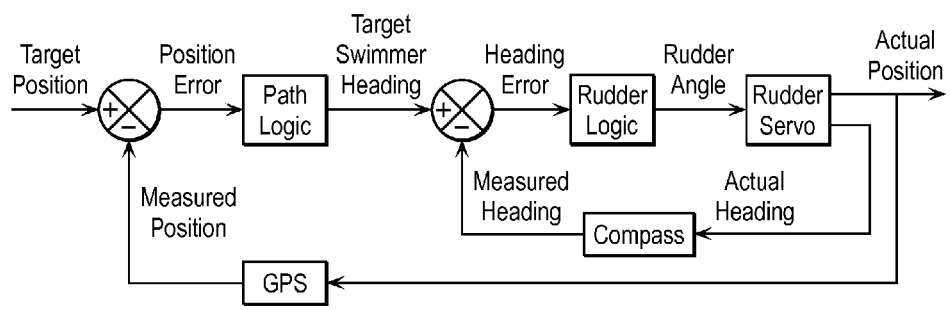
FIG. 13 is a is a block diagram of a control system of the type that might be used in any of the WPDs discussed herein for directing the WPD along a desired path.

FIG. 13 is a is a block diagram of a control system of the type that might be used in any of the WPDs discussed herein for directing the WPD along a desired path. This figure duplicates FIG. 5 in the above-referenced U.S. Pat. No. 7,371,136.

Figure 14:
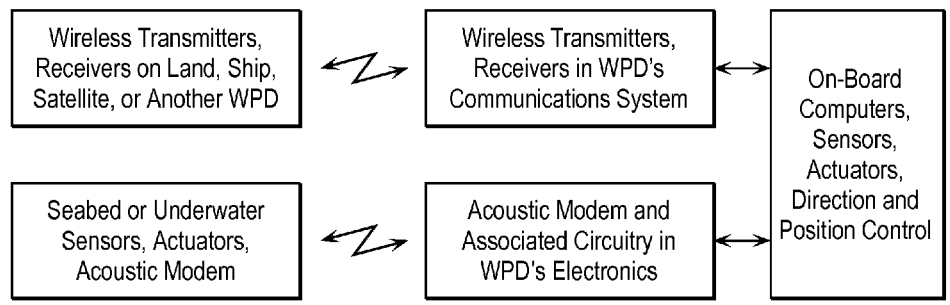
FIG. 14 is a block diagram schematically showing some of the ways that a representative WPD communicates with outside entities.

FIG. 14 is a block diagram schematically showing a representative WPD's on-board electronics and some of the ways that the representative WPD communicates with outside entities. As mentioned above, the WPD uses satellite location systems and radio to communicate data back to an operator and to receive navigation and other commands, and has on-board computers and sensors that allow it to navigate or hold position autonomously, without regular human interaction or control.

The float contains core electronics including: satellite position sensor (GPS), radio communications (preferably satcomm such as Iridium), an orientation sensing means such as a magnetic compass, batteries, navigation controller that uses information from the GPS and compass to control the rudder and steer the vehicle. The float may also include solar panels and various payload electronics such as environmental sensors or observation equipment such as radio monitors, cameras, hydrophones. All core electronics may be housed in the same enclosure, preferably at the tail end of the float. By keeping all the core electronics together, there is no need for wet connectors or cables in the core system. This is great reliability benefit. (solar panels and winches will connect with wet connectors—solar can be redundant so one connector can fail without taking the system down and winches are not necessary for basic functionality.) Since the GPS and sat-comm antennas are short, they will not shade the solar panels. Also the tail end is the least frequently submerged part of the float. (Submersion obscures the antennas.) however, as discussed above, with dual-tether embodiments, it is possible to house electronics and the like at the center of the float because the tether connections are near the end.

Terminology

The term "comprises" and grammatical equivalents (e.g., "includes" or "has") thereof are used herein to mean that other elements (i.e., components, ingredients, steps, etc.) are optionally present. For example, a water vehicle "comprising" (or "that comprises") components A, B, and C can contain only components A, B, and C, or can contain not only components A, B, and C but also one or more other components. The term "consisting essentially of" and grammatical equivalents thereof is used herein to mean that other elements may be present that do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, "from 5 to 15 feet" or "5-15 feet" means a range whose lower limit is 5 feet and whose upper limit is 15 feet. The terms "plural," "multiple," "plurality," and "multiplicity" are used herein to denote two or more than two items.

Where reference is made herein to a method comprising two or more defined steps, the defined steps can be carried out in any order or simultaneously (except where the context excludes that possibility), and the method can optionally include one or more other steps that are carried out before any of the defined steps, between two of the defined steps, or after all the defined steps (except where the context excludes that possibility). Where reference is made herein to "first" and "second" elements, this is generally done for identification purposes; unless the context requires otherwise, the first and second elements can be the same or different, and reference to a first element does not mean that a second element is necessarily present (though it may be present). Where reference is made herein to "a" or "an" element, this does not exclude the possibility that there are two or more such elements (except where the context excludes that possibility). Where reference is made herein to two or more elements, this does not exclude the possibility that the two or more elements are replaced by a lesser number or greater number of elements providing the same function (except where the context excludes that possibility). The numbers given herein should be construed with the latitude appropriate to their context and expression; for example, each number is subject to variation that depends on the accuracy with which it can be measured by methods conventionally used by those skilled in the art.

Unless otherwise noted, the references to the positioning and shape of the vehicle refer to that positioning and shape when the vehicle is in still water. The terms listed below are used in this specification in accordance with the definitions given below.

"Leading edge" (or leading end) and "trailing edge" (or trailing end) denote the front and rear surfaces respectively of a fin or other component as wave power causes the vehicle to move forward.

"Fore" and "aft" denote locations relatively near the leading and trailing edges (or ends) respectively.

"Aligned" denotes a direction that lies generally in a vertical plane that is parallel to the vertical plane that includes the axial centerline of the swimmer. "Axially aligned" denotes a direction that lies generally in the vertical plane that includes the axial centerline of the swimmer.

"Transverse" denotes a direction that lies generally in a vertical plane orthogonal to the vertical plane that includes the axial centerline of the swimmer.

Where reference is made herein to a feature that "generally" complies with a particular definition, for example "generally in a vertical plane," "generally laminar," or "generally horizontal," it is to be understood that the feature need not comply strictly with that particular definition, but rather can depart from that strict definition by an amount that permits effective operation in accordance with the principles of the invention.

CONCLUSION

In conclusion, it can be seen that the embodiments of the invention provide structures and methods that can improve the handling of WPDs during storage, transport, launch, and recovery.

In the Summary of the Invention and the Detailed Description of the Invention above, and the accompanying drawings, reference is made to particular features of the invention. It is to be understood that the disclosure of the invention in this specification includes all possible combinations of such particular features. For example, where a particular feature is disclosed in the context of a particular aspect, a particular embodiment, or a particular figure, that feature can also be used, to the extent appropriate, in the context of other particular aspects, embodiments, and figures, and in the invention generally. It is also to be understood that this invention includes all novel features disclosed herein and is not limited to the specific aspects of the invention set out above.

While the above is a complete description of specific embodiments of the invention, the above description should not be taken as limiting the scope of the invention as defined by the claims.

What is claimed is:

1. A wave-powered device (WPD) comprising:
   (1) a float;
   (2) a wave-actuated component formed with an aperture;
   (3) a closure component associated with one or both of the float and the wave-actuated component, the closure component having a first state in which it secures the float and the wave-actuated component together as an assembly that can be moved as a unit and a second state that permits the wave-actuated component to move away from the float;
   (4) a tether having a first end connected to the float and a second end connected to the wave-actuated component, such that
       when the closure component is in the second state and the float is placed on or near the surface of still water, the float floats on or near the surface of the still water, the tether extends downwards from the float and under tension, and the wave-actuated component is submerged below the float, and when the closure component is in the second state and the float is placed on or near the surface of wave-bearing water, the float floats on or near the surface of the wave-bearing water, the tether extends downwards from the float, and the wave-actuated component is submerged below the float, and interacts with the water to generate forces that are transmitted to the tether; and (5) a winch mounted on the float above the aperture in the wave-actuated component for raising and/or lowering a load through the aperture.

2. The WPD of claim 1 wherein the float has top, bottom, and side surfaces, and comprises float side components that extend downwards generally parallel to the side surfaces to create a space defined by the bottom surface and the float side components, and the wave-actuated component is at least partially within that space.

3. The WPD of claim 1 wherein the wave-actuated component comprises components that extend upwards from the wave-actuated component and that interact with components of the float to locate the wave-actuated component in a fixed position in relation to the float, and/or the float comprises components that extend downwards and that interact with components of the wave-actuated component to locate the wave-actuated component in a fixed position in relation to the float.

4. The WPD of claim 1 wherein:
the wave-actuated component comprises fins that, when the WPD is in wave-bearing water, rotate about an axis to generate the forces that are transmitted to the tether; and
the wave-actuated component includes members that extend downwards from the wave-actuated component and that, when the closure component is in the first state and the assembly is placed on a horizontal surface, separate the fins from the horizontal surface.

5. The WPD of claim 1 wherein the tether has at least one of the following characteristics:
(1) the tether has a substantially flat configuration with an average thickness of 1-3 mm;
(2) the tether is free from components that carry electrical currents and/or is free from components that carry signals of any kind;
(3) the tether comprises a plurality of round tensile members;
(4) the tether is a flat webbing constructed of a synthetic polymer;
(5) the tether is a flat webbing that is tensioned only along the leading edge thereof, thus reducing fluttering and bowing;
(6) the tether is attached to the float at a hinge point that comprises a shaft and bushing arrangement such that the tether is not required to flex against its wide axis (pitch);
(7) at the float, the tether is guided through a 90° twist, and then flexes in the pitch axis over a pulley with its axis level and perpendicular to the longitudinal axis of the float;
(8) at the float, the tether is guided through a 90° twist, and then flexes in the pitch axis over a pulley with its axis level and perpendicular to the longitudinal axis of the float, wherein the pulley is crowned to increase the tension on the center of the tether to lessen the effect of the 90° twist increasing the tension of the outer parts of the tether, relative to the center of the tether.

6. The WPD of claim 1 wherein the float comprises a rudder near the aft end of the float.

7. The WPD of claim 1, and further comprising:
(1) wireless communications equipment;
(2) a computer system;
(3) a satellite-referenced position sensor;
(4) a horizontal direction sensor that senses direction in a horizontal plane; and
(5) a steering actuator;
the computer system,
(a) being linked to the communications equipment, the position sensor, the horizontal sensor and the steering actuator, and
(b) containing, or being programmable to contain, instructions to control the steering actuator in response to signals received from the communications equipment, or from the position sensor and the horizontal direction sensor, or from signals received from another sensor on the vehicle.

8. A method for controlling a function of the WPD of claim 1, the method comprising sending signals to the device.

9. A method of obtaining information, the method comprising receiving signals from, or recorded by, the WPD of claim 1.

10. A wave-powered device comprising:
(1) a float;
(2) a wave-actuated component;
(3) a closure component associated with one or both of the float and the wave-actuated component, the closure component having a first state in which it secures the float and the wave-actuated component together as an assembly that can be moved as a unit and a second state that permits the wave-actuated component to move away from the float;
(4) a tether having a first end connected to the float and a second end connected to the wave-actuated component, such that
when the closure component is in the second state and the float is placed on or near the surface of still water, the float floats on or near the surface of the still water, the tether extends downwards from the float and under tension, and the wave-actuated component is submerged below the float, and
when the closure component is in the second state and the float is placed on or near the surface of wave-bearing water, the float floats on or near the surface of the wave-bearing water, the tether extends downwards from the float, and the wave-actuated component is submerged below the float, and interacts with the water to generate forces that are transmitted to the tether; and
(5) a winch mounted on the float that can be operated to retract the tether from an extended position to a position where the wave-actuated component is drawn into contact with the float;
wherein the winch comprises wiping elements that clean the tether when the tether is drawn through the winch.

11. A wave-powered device comprising:
(1) a float;
(2) a wave-actuated component;
(3) a closure component associated with one or both of the float and the wave-actuated component, the closure component having a first state in which it secures the float and the wave-actuated component together as an assembly that can be moved as a unit and a second state that permits the wave-actuated component to move away from the float;

(4) a tether having a first end connected to the float and a second end connected to the wave-actuated component, such that when the closure component is in the second state and the float is placed on or near the surface of still water, the float floats on or near the surface of the still water, the tether extends downwards from the float and under tension, and the wave-actuated component is submerged below the float, and when the closure component is in the second state and the float is placed on or near the surface of wave-bearing water, the float floats on or near the surface of the wave-bearing water, the tether extends downwards from the float, and the wave-actuated component is submerged below the float, and interacts with the water to generate forces that are transmitted to the tether; and (5) a winch mounted on the float that can be operated to retract the tether from an extended position to a position where the wave-actuated component is drawn into contact with the float;

wherein the winch is hinged in the pitch axis.

12. The WPD of claim 11 wherein:

the first-mentioned winch is relatively close to the fore end of the float, and the float further comprises a second winch that is relatively close to the aft end of the float and a second tether attached to the second winch.

13. The WPD of claim 11 wherein the wave-actuated component is selected from one of the following two configurations:

(A) the wave-actuated component has a single substantially rigid spine, with fins extending on each side of the rigid spine, and when the WPD is in still water and the tether is in an extended position below the float, the rigid spine is at an angle of at most 40° to the horizontal, and lies in a vertical plane that passes through the longitudinal axis of the float; or (B) the wave-actuated component has two substantially rigid spines, with fins extending between the rigid spines, and both the rigid spines, when the WPD is in still water and the tether is in an extended position below the float, lie in a plane at an angle of at most 40° to the horizontal, and the rigid spines are equally spaced from a vertical plane that passes through the longitudinal axis of the float.

14. The WPD of claim 12 wherein the wave-actuated component is selected from one of the following two configurations:

(A) the wave-actuated component has a single substantially rigid spine, with fins extending on each side of the rigid spine, and when the wave-actuated component is combined with a tether and a float in the form of a WPD and the WPD is in still water and the tether is in an extended position below the float, the rigid spine is at an angle of at most 15° to the horizontal, and lies in a vertical plane that passes through the longitudinal axis of the float; or (B) the wave-actuated component has two substantially rigid spines, with fins extending between the rigid spines, and both the rigid spines, when the wave-actuated component is combined with a tether and a float in the form of a WPD and the WPD is in still water and the tether is in an extended position below the float, both rigid spines lie in a plane at an angle of at most 15° to the horizontal, and the rigid spines are equally spaced from a vertical plane that passes through the longitudinal axis of the float.

15. The WPD of claim 14 wherein, when the WPD is in still water, the fins lie side-by-side in a plane that is at an angle of at most 15° to the horizontal.

16. A wave-powered device comprising:

(1) a float;

(2) a flexible tether;

(3) a wave-actuated component, the tether connecting the float and the wave-actuated component wherein the wave-actuated component is formed with an aperture;

the float, the tether, and the wave-actuated component being such that (A) when the device is in still water, (i) the float is on or near the surface of the water, (ii) the wave-actuated component is submerged below the float, and (iii) the tether is under tension; and (B) when the device is in wave-bearing water, the wave-actuated component interacts with the water to generate forces that are transmitted to the tether;

(4) a first winch that can be operated to retract the tether from an extended position to a position where the wave-actuated component is drawn into contact with the float; and (5) a second winch mounted on the float above the aperture in the wave-actuated component for raising and/or lowering a load through the aperture.

17. A wave-powered device comprising:

(1) a float;

(2) a flexible tether; and (3) a wave-actuated component, the tether connecting the float and the wave-actuated component wherein the wave-actuated component is formed with an aperture;

the float, the tether, and the wave-actuated component being such that (A) when the device is in still water, (i) the float is on or near the surface of the water, (ii) the wave-actuated component is submerged below the float, and (iii) the tether is under tension; and (B) when the device is in wave-bearing water, the wave-actuated component interacts with the water to generate forces that are transmitted to the tether;

(4) a winch mounted on the float above the aperture in the wave-actuated component for raising and/or lowering a load through the aperture.

18. A wave-powered device comprising:

(1) a float;

(2) a flexible tether; and (3) a wave-actuated component, the tether connecting the float and the wave-actuated component;

the float, the tether, and the wave-actuated component being such that (A) when the device is in still water, (i) the float is on or near the surface of the water, (ii) the wave-actuated component is submerged below the float, and (iii) the tether is under tension; and (B) when the device is in wave-bearing water, the wave-actuated component interacts with the water to generate forces that are transmitted to the tether;

(4) a winch that can be operated to retract the tether from an extended position to a position where the wave-actuated component is drawn into contact with the float;

wherein the winch is hinged in the pitch axis.

19. A wave-powered water vehicle, comprising:

a) a first component that is a float that travels on or near the water surface;

b) a second component that is wave actuated and travels below the first component;
c) first and second tethers that connect the first and second components, such that the tethers can be retracted from an extended position to a position where the wave-actuated component is drawn into contact with the float, wherein the first and second tethers engage the first component at spaced positions and engage the second component at spaced positions; and
d) engagement means, associated with one or both of the first and second components, whereby the first component engages the second component and/or the second component engages the first component when the tethers are retracted;

wherein said engagement means provides lateral support of one component for the other, and thereby minimizes lateral movement of one against the other when the components are fitted together when the tethers are retracted.

20. A wave-powered water vehicle, comprising:
a) a first component that is a float that travels on or near the water surface;
b) a second component that:
   is wave actuated and travels below the first component,
   comprises multiple tiers of wave actuated fins, wherein
      each tier is movable and separable from any adjacent tier, and
      each tier is provided with upwardly or downwardly extending structure to nest with any adjacent tier or the float; and
c) an internal securing means built into one component, the other component, or both, whereby one of said components may be secured against the other.

21. The wave-powered water vehicle of claim 19 wherein said engagement means is a hollow in the first component configured to engage the second component.

22. The wave-powered water vehicle of claim 19, wherein the first component comprises two floating pontoons, and the second component is configured to fit between and engage said pontoons.

23. The wave-powered water vehicle of claim 19 wherein said engagement means comprises rails on the second component that extend upwards to engage both sides of the first component.

24. The wave-powered water vehicle of claim 20 wherein the upwardly or downwardly extending structure on the multiple tiers of wave actuated fins takes the form of a pair of longitudinally extending side beams.

25. The wave-powered water vehicle of claim 24 wherein all of said tiers nest into each other, thereby reducing height when the tiers are stacked upon each other.

26. The wave-powered water vehicle of claim 25 wherein said tiers comprise an upper tier whose side beams have upwardly protruding edges that engage the first component downwardly protruding edges that engage a tier immediately underneath the upper tier.

27. The wave-powered water vehicle of claim 20 wherein said internal securing means comprises one or more tethers joining the first component to the second component that can be drawn upwards and secured so that the second component is secured against the first component.

28. The wave-powered water vehicle of claim 20 wherein the internal securing means secures the uppermost tier of the multiple tiers to the first component, and each other tier of the multiple tiers to the tier immediately above that tier.

* * * * *